(12) United States Patent
Nagai et al.

(10) Patent No.: US 7,562,857 B2
(45) Date of Patent: Jul. 21, 2009

(54) ATTACHING STRUCTURE

(75) Inventors: Kentaro Nagai, Shizuoka (JP);
Takayuki Mizushima, Shizuoka (JP);
Masahiro Sawayanagi, Shizuoka (JP);
Hiroyuki Suzuki, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 97 days.

(21) Appl. No.: 11/826,277

(22) Filed: Jul. 13, 2007

(65) Prior Publication Data
US 2008/0011930 A1 Jan. 17, 2008

(30) Foreign Application Priority Data
Jul. 13, 2006 (JP) ............................ 2006-192637
May 29, 2007 (JP) ............................ 2007-141922

(51) Int. Cl.
*A47B 97/00* (2006.01)

(52) U.S. Cl. .................... 248/503; 248/317; 248/231.9; 248/27.1; 248/27.3; 248/222.12; 362/362

(58) Field of Classification Search ................ 248/317, 248/231.9, 27.1, 27.3, 222.12, 224.8; 362/362
See application file for complete search history.

(56) References Cited

U.S. PATENT DOCUMENTS

| | | | | |
|---|---|---|---|---|
| 2,889,124 A * | 6/1959 | Roof | ........................... | 248/27.1 |
| 3,213,189 A * | 10/1965 | Mitchell et al. | ......... | 174/138 R |
| 4,139,755 A * | 2/1979 | Hastings et al. | ............. | 200/295 |
| 4,406,936 A * | 9/1983 | Ohashi | ........................ | 200/296 |
| 4,602,760 A * | 7/1986 | Tiefenbach et al. | .......... | 248/544 |
| 4,702,711 A * | 10/1987 | Falchi | ......................... | 439/546 |
| 5,056,853 A * | 10/1991 | Van Order | ................. | 296/97.9 |
| 5,217,190 A * | 6/1993 | Reed et al. | .................. | 248/27.3 |
| 5,343,006 A * | 8/1994 | Moffett | ....................... | 200/296 |
| 5,475,577 A * | 12/1995 | Vanderhoof et al. | .......... | 362/368 |
| 5,662,375 A * | 9/1997 | Adams et al. | ................ | 296/214 |
| 5,718,549 A * | 2/1998 | Noda et al. | .................. | 411/553 |
| 5,752,853 A * | 5/1998 | Curtindale | .................... | 439/567 |
| 6,007,136 A * | 12/1999 | Zittwitz et al. | ............. | 296/97.9 |
| 6,021,986 A * | 2/2000 | Murdock | ................ | 248/289.11 |
| 6,158,802 A * | 12/2000 | Akagi et al. | ................. | 296/214 |
| 6,406,087 B2 * | 6/2002 | Sawayanagi | ................ | 296/97.9 |
| 6,481,682 B2 * | 11/2002 | Miura | ...................... | 248/231.9 |
| 6,511,029 B2 * | 1/2003 | Sawayanagi | ............. | 248/224.8 |

(Continued)

FOREIGN PATENT DOCUMENTS

JP 2005-75219 3/2005

*Primary Examiner*—J. Allen Shriver, II
*Assistant Examiner*—Alaeddin Mohseni
(74) *Attorney, Agent, or Firm*—Kratz, Quintos & Hanson, LLP

(57) ABSTRACT

A design part composing a lamp unit includes a plate part positioned at a cabin side and covering an attaching hole of a roof trim, and a pair of vertically extending parts. The vertically extending part includes a frame part vertically extending from the plate part in a direction perpendicular to the plate part, and a movable piece continued to a connecting part of the frame part at a far side from the plate part. When a function part is pushed into between the pair of movable pieces, the gap between the movable pieces is increased, and a locking margin between the movable piece and an outer edge of an attaching hole is increased. Thus, holding force to hold the roof trim is secured.

5 Claims, 23 Drawing Sheets

U.S. PATENT DOCUMENTS

| | | | |
|---|---|---|---|
| 6,726,165 B2 * | 4/2004 | Sawayanagi et al. | 248/224.8 |
| 6,799,743 B2 * | 10/2004 | Sawayanagi | 248/27.1 |
| 6,817,583 B2 * | 11/2004 | Wilson | 248/231.9 |
| 2002/0005464 A1 * | 1/2002 | Miura | 248/231.9 |
| 2008/0011930 A1 * | 1/2008 | Nagai et al. | 248/503 |
| 2008/0087744 A1 * | 4/2008 | Baba | 239/284.2 |
| 2008/0093521 A1 * | 4/2008 | Doi et al. | 248/231.9 |
| 2008/0184802 A1 * | 8/2008 | Sato | 73/632 |
| 2008/0224006 A1 * | 9/2008 | Call et al. | 248/231.9 |
| 2009/0052194 A1 * | 2/2009 | Jowid | 362/351 |

* cited by examiner

ATTACHING STRUCTURE

CROSS-REFERENCE TO RELATED APPLICATIONS

This application is on the basis of Japanese Patent Application No. 2007-141922, the contents of which are hereby incorporated by reference.

BACKGROUND OF THE INVENTION

1. Field of the Invention

The present invention relates to an attaching structure configured to attach a room lighting system (attaching object) for illuminating an inside of a vehicle to an attaching hole formed on an interior wall (panel) such as a roof trim.

2. Description of the Related Art

FIGS. 21 and 22 show sectional views showing a conventional attaching structure 200 in which a conventional room lighting system 205 (attaching object) is attached to an attaching hole 21 of a roof trim 2 (panel) or a door trim (panel) for covering a vehicle body (see Patent Document 1).

The room lighting system 205 includes a design part 203 having a housing 231 and a lens 208, and a function part 204 having a bulb 207 as a light source. This lens 208 is embedded in the housing 231, and integrated with the housing 231. The housing 231 is formed larger than an outer shape of the attaching hole 21. Further, as shown in FIG. 22, the housing 231 has a locking claw 232 for locking on an edge of the attaching hole 21 at an end of the housing 231. The housing 231 has an engaging part 233 for engaging with the function part 204 at the other end of the housing 231. A wiring harness 206 supplies electric power to the bulb 207.

When attaching the room lighting system 205 to the attaching hole 21, as shown in FIG. 22, the design part 203 is pushed up from a cabin side to the attaching hole 21 so that the locking claw 232 is locked on the edge of the attaching hole 21, and simultaneously, the function part 204 is inserted into the engaging part 233 from a rear side of the attaching hole 21 to be engaged with the engaging part 233. Thus, the edge of the attaching hole 21 is caught between the function part 204 and the housing 231. Thus, the locking claw 232 is locked on the edge of the attaching hole 21 at the end of the design part 203, and the end of the attaching hole 21 is caught between the design part 203 and the function part 204 at the other end of the design part 203. Thus, the room lighting system 205 is attached to the attaching hole 21 of the roof trim 2.

[Patent Document 1] Japanese Published Patent Application No. 2005-75219

According to the conventional attaching structure 200 of the room lighting system 205, as a locking margin to the end of the attaching hole 21 from the locking claw 232 increases, holding power of the roof trim 2 increases. However, when the locking margin is large, a bending volume of the locking claw 232 for inserting the locking claw 232 from the cabin side into the attaching hole 21 also becomes large. Therefore, there is a problem that the bending force of the locking claw 232, namely, an insertion force into the attaching hole 21 is increased.

Further, according to the attaching structure 200, it is necessary that the design part 203 is attached to the attaching hole 21, and simultaneously, the function part 204 is assembled with the design part 203. Therefore, there is another problem that workability is not good. If these operations are not done simultaneously, as shown in FIG. 23, the design part 203 falls out of the attaching hole 21.

Accordingly, an object of the present invention is to provide an attaching structure for allowing an attaching object to be attached to an attaching hole of a panel with low insertion force, and for preventing the attaching object from falling out of the attaching hole.

SUMMERY OF THE INVENTION

In order to attain the object, according to the present invention, there is provided an attaching structure for attaching an attaching object composed of first and second parts to an attaching hole formed on a panel, wherein the first part includes: a plate part formed larger than an outer shape of the attaching hole, and disposed in front of the attaching hole; and a pair of vertically extending parts facing each other, extending from the plate part, and having a resilient connecting part, wherein when the pair of vertically extending parts is inserted into a rear side of the attaching hole via an inside of the attaching hole, the plate part is bent around the connecting part, wherein the pair of vertically extending parts is formed movably among: an insertion position where outer edges of the vertically extending parts are positioned at an inside of the attaching hole; a temporary locking position where the outer edges are positioned at an outside of the attaching hole, and the first part is temporarily locked on the attaching hole while catching an edge of the attaching hole with the plate part; and a permanent locking position where the outer edges are positioned at an outer side of the attaching hole than that of the temporary locking position, and the first part is permanently locked on the attaching hole, wherein when the first part separated from the second part is temporarily locked on the attaching hole, and then the second part is pushed into between the pair of vertically extending parts, the second part is assembled with the first part, and the pair of vertically extending parts is positioned at the permanent locking position.

Preferably, when the pair of vertically extending parts is bent around the connecting part connected to the plate part and formed thinner than the other parts, the pair of vertically extending parts is shifted from the insertion position to the permanent locking position.

Preferably, the pair of vertically extending parts includes: a frame part vertically extended from the plate part in a direction perpendicular to the plate part; and a pair of movable pieces disposed in the frame part, continued to an end of the frame part at a far side of the plate part, and bent around the connecting part because the connecting part connected to the frame part is thinner than the other parts. Further, by pushing the second part into between the pair of movable pieces, the pair of movable pieces is bent in a direction of separating each other, so that the edge of the attaching hole is positioned between outer edges of the movable pieces and the plate part.

Preferably, the pair of vertically extending parts includes slope parts sloped in a direction of removing from the plate part, and breaking into an inner edge at the rear side of the attaching hole as the pair of vertically extending parts separates from each other in a state that the pair of vertically extending parts is positioned at the permanent locking position.

Preferably, the pair of vertically extending parts includes guiding members for guiding the second part into therebetween.

These and other objects, features, and advantages of the present invention will become more apparent upon reading of the following detailed description along with the accompanied drawings.

DETAILED DESCRIPTION OF THE PREFERRED EMBODIMENTS

Figure 1:
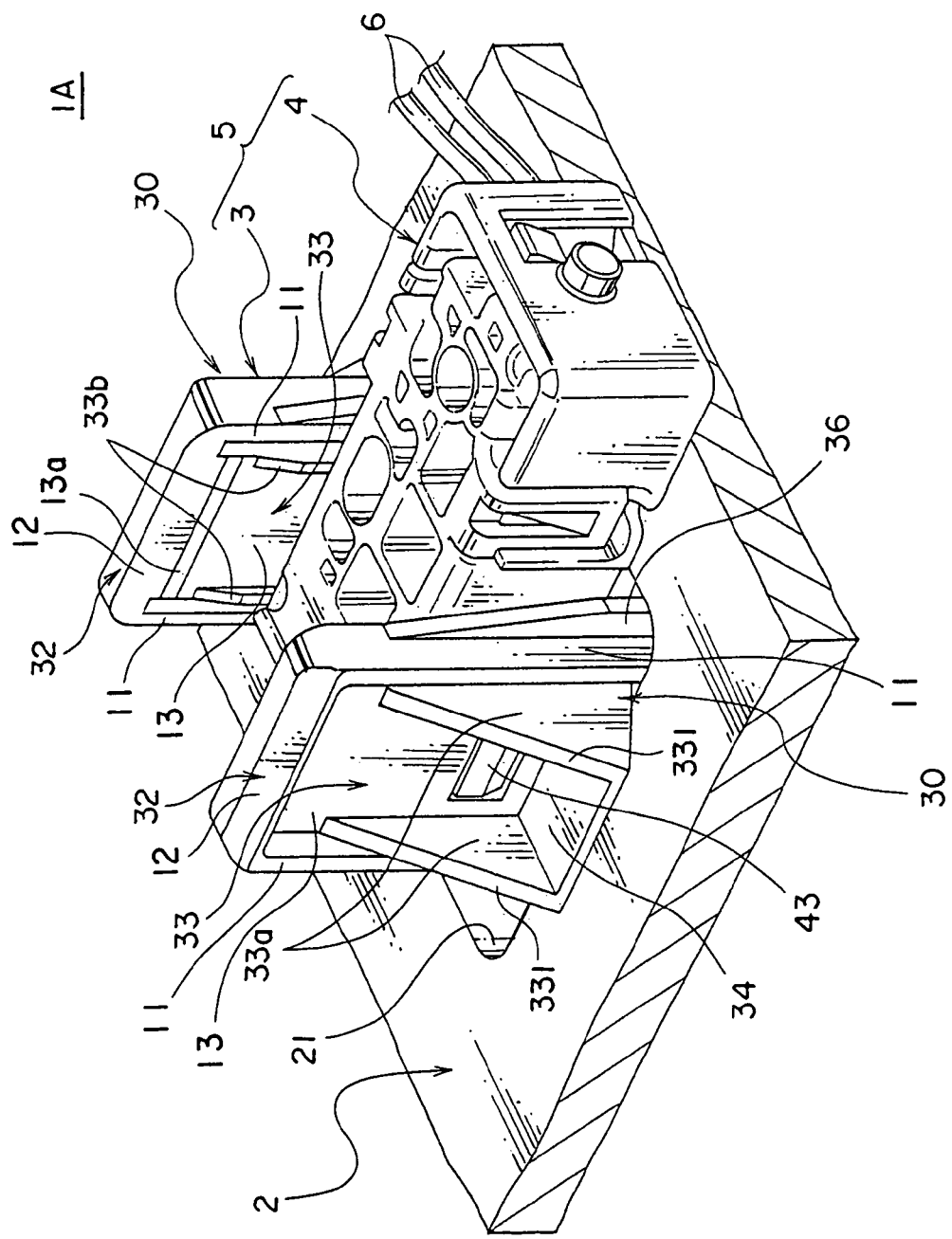
FIG. 1 is a perspective view showing an attaching structure according to a first embodiment of the present invention.
Figure 2:
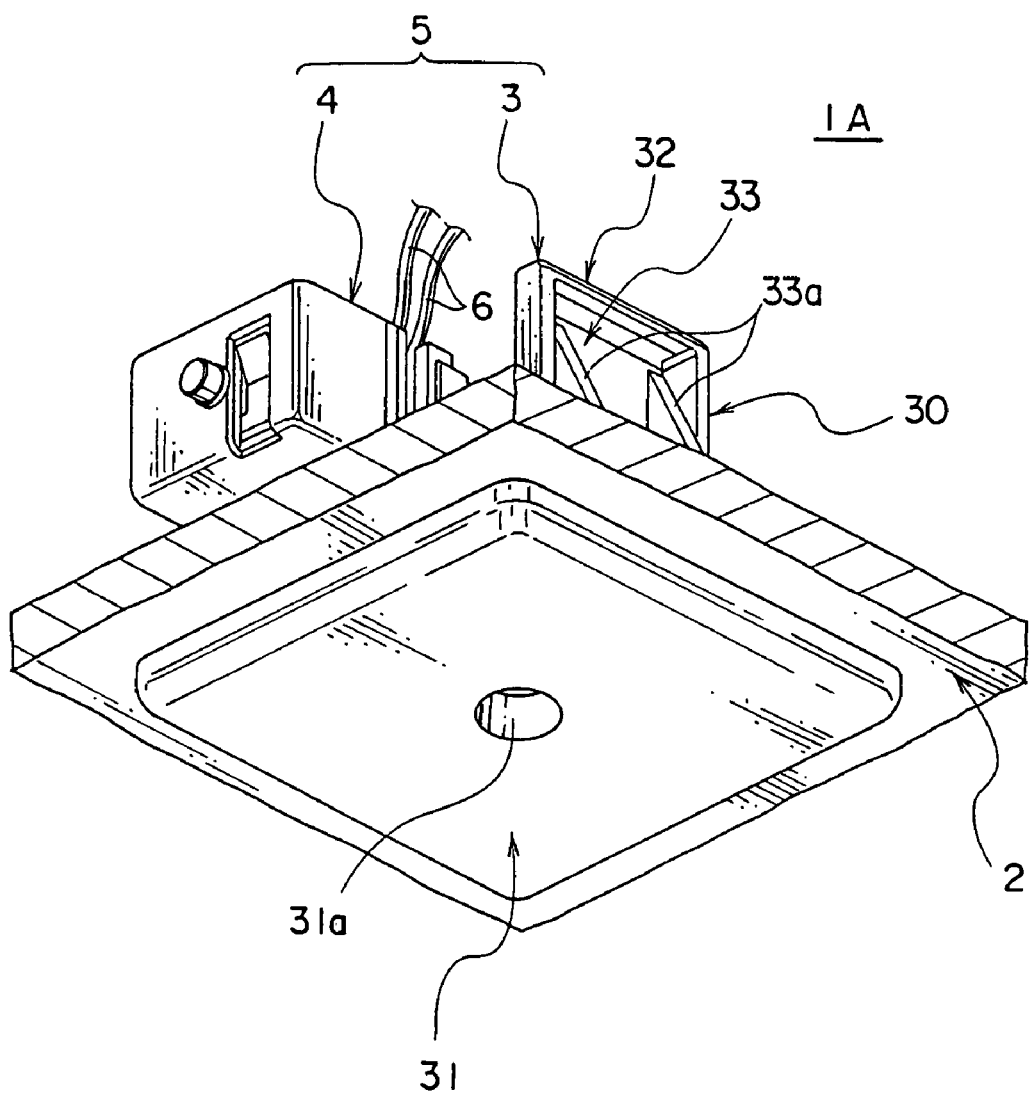
FIG. 2 is an upside-down perspective view showing the attaching structure shown in FIG. 1.

An attaching structure 1A according to a first embodiment of the present invention will be explained with FIGS. 1 to 9. As shown in FIGS. 1 to 2, according to the attaching structure 1A, a room lighting system for a vehicle (hereunder referred to as lamp unit 5) as an attaching object is attached to an attaching hole 21 formed on a roof trim 2 of a vehicle as a panel. The roof trim 2 is made of synthetic resin and composes a roof of a vehicle. The roof trim 2 is mounted on an inside of a cabin. The lamp unit 5 illuminates the inside of the cabin, and as shown in FIG. 1, includes a design part 3 as a first part and a function part 4 as a second part.

Figure 3:
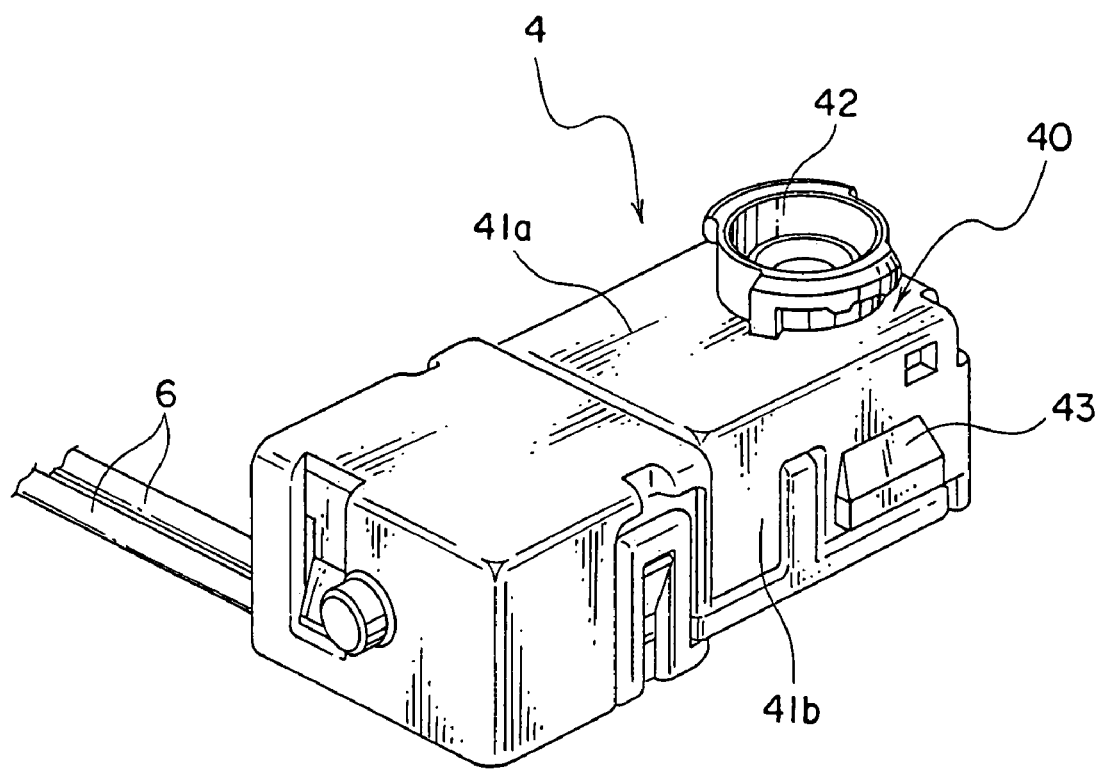
FIG. 3 is a perspective view showing a second part composing an attaching object of the attaching structure.

As shown in FIG. 3, the function part 4 includes a light source such as an LED (light emitting diode) or a light bulb in a housing 40 formed in a substantially rectangular shape and made of synthetic resin. A translucent window 42 is mounted on a bottom wall 41a of the housing 40 for guiding the light from the light source to the cabin. The translucent window 42 is interposed between a pair of sidewalls 41b having a pair of locking projections 43 for engaging with later-described locking holes 37 of the design part 3. The locking projections 43 are projected from the sidewalls 41b in a direction of separating each other.

The function part 4 is positioned on a rear side of the attaching hole 21, namely, a ceiling side. In addition, the function part 4 is assembled with the design part 3 in a direction that the bottom wall 41a having the translucent window 42 faces downward, namely, faces the cabin. Further, a wiring harness 6 is attached for supplying electric power to the light source.

Figure 4:
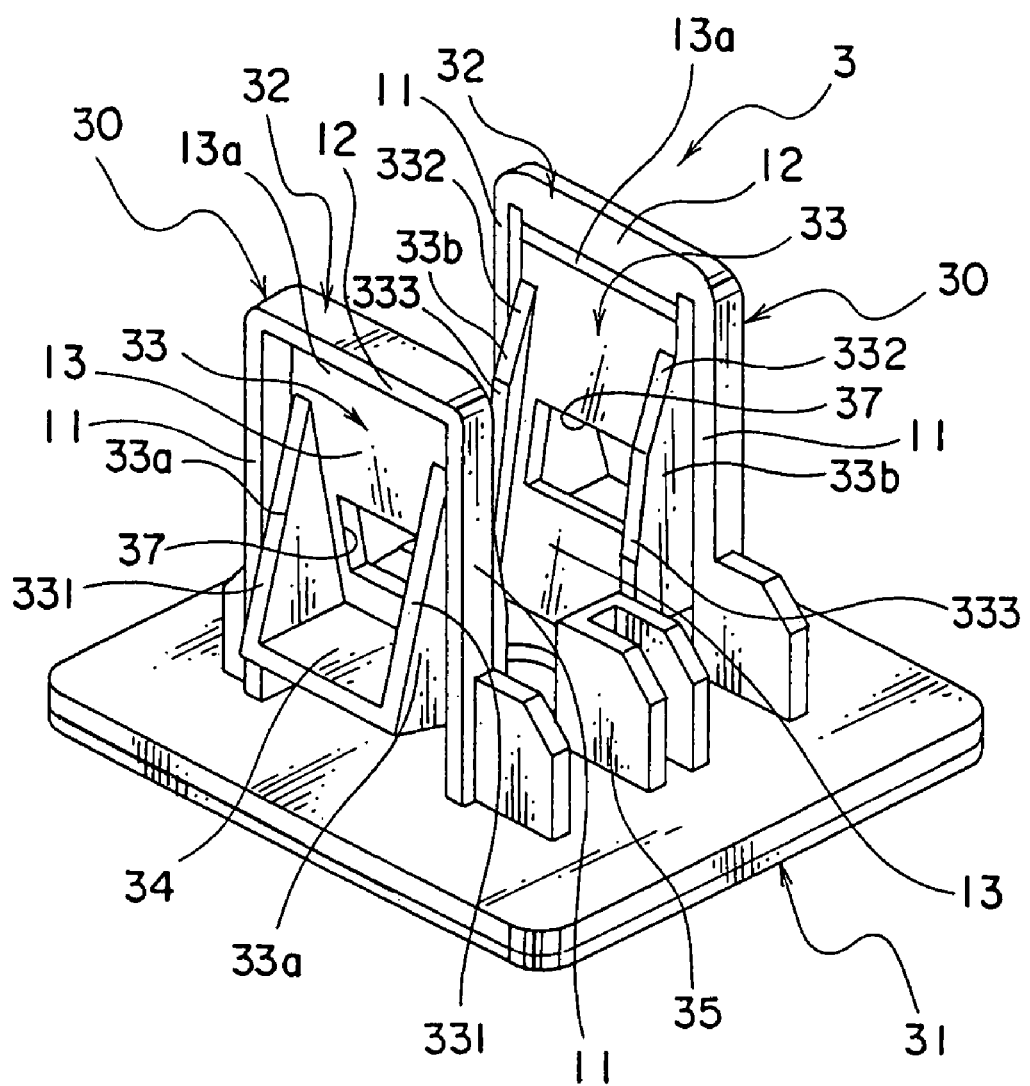
FIG. 4 is a perspective view showing a first part composing the attaching object of the attaching structure.
Figure 5:
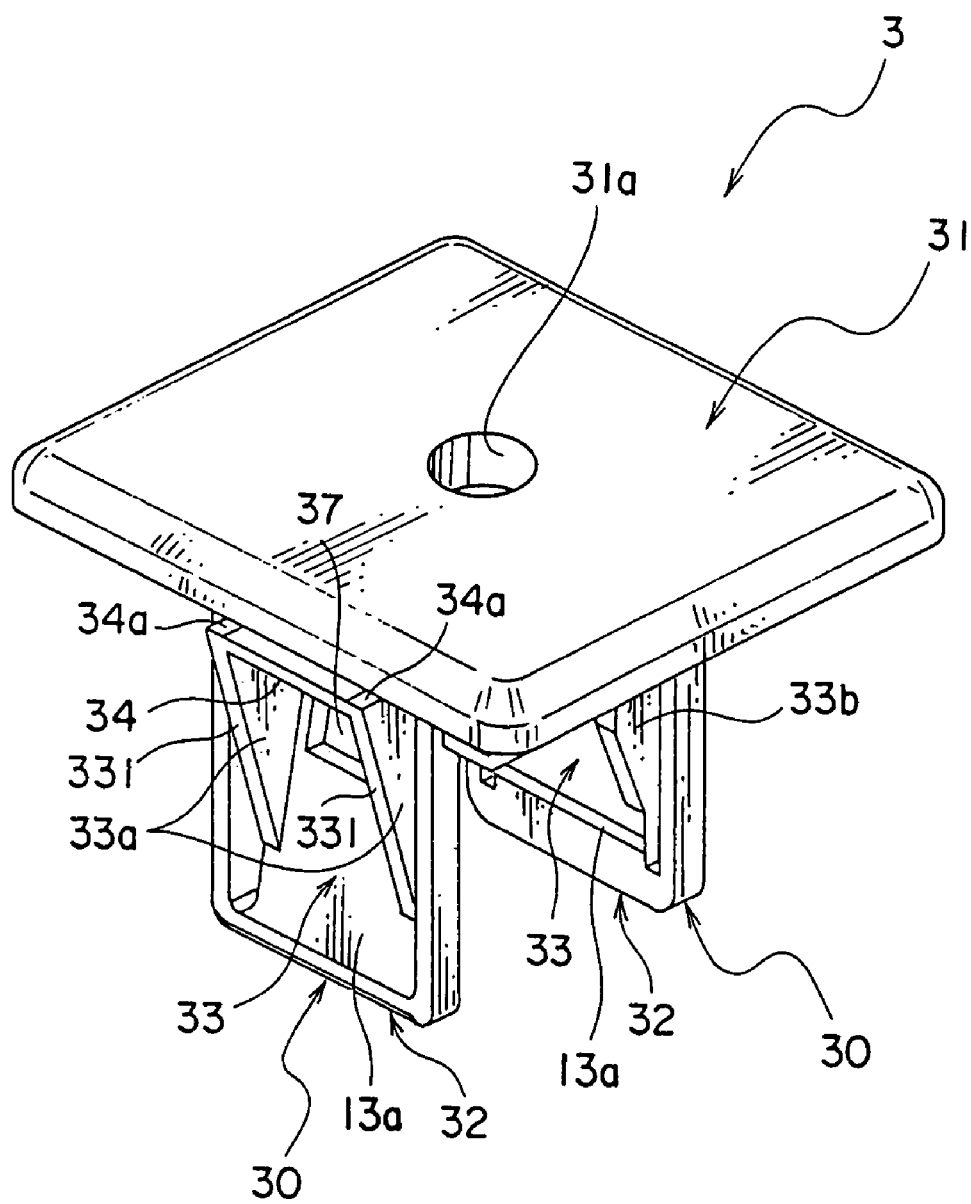
FIG. 5 is an up-side down perspective view showing the first part shown in FIG. 4.
Figure 6:
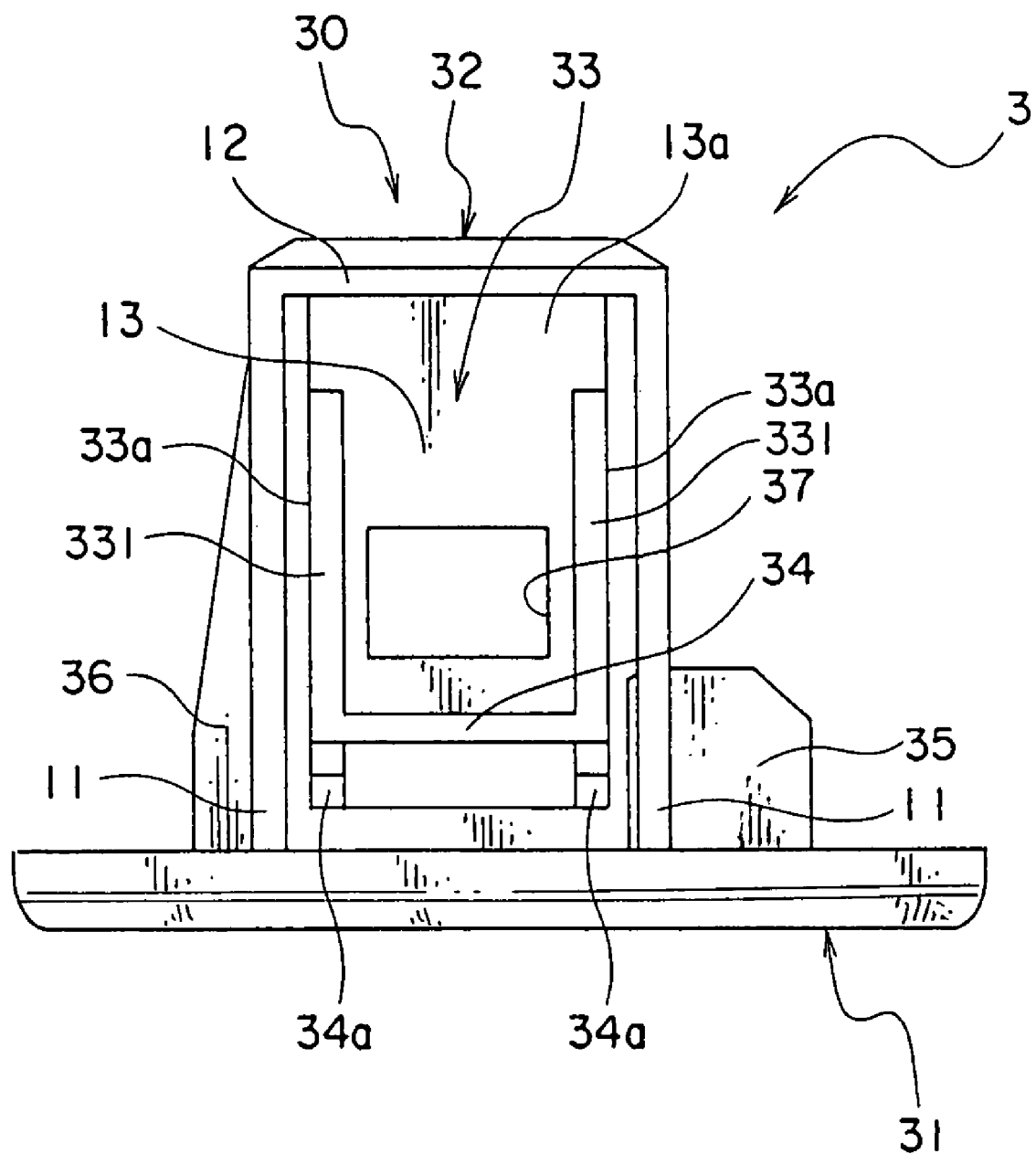
FIG. 6 is a front view showing the first part shown in FIG. 4.

The design part 3 is made of synthetic resin and as shown in FIGS. 4 to 6, includes a plate part 31, a pair of vertically extending parts 30, and a function part positioning part 35. The plate part 31 forms an outward appearance of the lamp unit 5. The plate part 31 is positioned in front of the attaching hole 21, namely, the cabin side and covers the attaching hole 21, while the lamp unit 5 is attached to the attaching hole 21. The vertically extending parts 30 are vertically extended from the plate part 31, and face each other. The vertically extending parts 30 are positioned at the rear side of the attaching hole 21, namely, the ceiling side.

The plate part 31 is formed larger than an outer shape of the attaching hole 21. While the lamp unit 5 is attached to the attaching hole 21, the plate part 31 is formed in a square shape in a plan view seeing from the cabin. A translucent hole 31a is formed on the plate part 31 at a position with which the translucent window 42 overlaps while the function part 4 is assembled with the design part 3. The light emitted through the translucent window 42 is led to the cabin through the hole 31a.

The pair of vertically extending parts 30 respectively includes: a frame part 32 vertically extended from the plate part 31; a movable piece 33 continued to the frame part 32; and a rib 36 continued to the frame part 32.

As shown in FIG. 4, the frame part 32 is formed in a frame shape, and includes a pair of upright parts 11 and a connecting part 12. Each upright part 11 is formed in a bar shape. The upright parts 11 are spaced to each other, and vertically extended in a direction perpendicular to the plate part 31. The connecting part 12 is formed in a bar shape, and connects ends of the upright parts 11 at far sides from the plate part 31.

Further, the frame part 32 is hardly resiliently deformed throughout before the design part 3 is attached to the attaching hole 21 and after the design part 3 is permanently locked on the attaching hole 21. While the design part 3 is permanently locked on the attaching hole 21, the frame part 32 is positioned on an inside of the attaching hole 21.

The movable piece 33 is disposed at an inside of the frame part 32, and continued to the connecting part 12 of the frame part 32. The movable piece 33 includes: a flat part 13 extended toward the plate part 31; a clamping part 34 vertically extended from the flat part 13; a pair of ribs 34a vertically extended from the clamping part 34 as slope members; a pair of first guiding walls 33a; and a pair of second guiding walls 33b as guiding members.

The flat part 13 is disposed slidingly so that a gap between both flat parts 13 becomes narrower from the connecting part 12 to the plate part 31 while the movable piece 33 is not pressed. Namely, a pair of flat parts 13 is disposed slidingly against a vertically extending direction of the upright parts 11 of the frame part 32 while the movable piece 33 is not pressed.

Further, a connecting part 13a of the flat part 13 connected to the connecting part 12 is formed thinner than the other parts. Namely, the connecting part 13a is formed thinner than the other parts away from the connecting part 12. Namely, the flat part 13 is allowed to be bent around the connecting part 13a in a direction of approaching to and removing from the other flat part 13.

Figure 7:
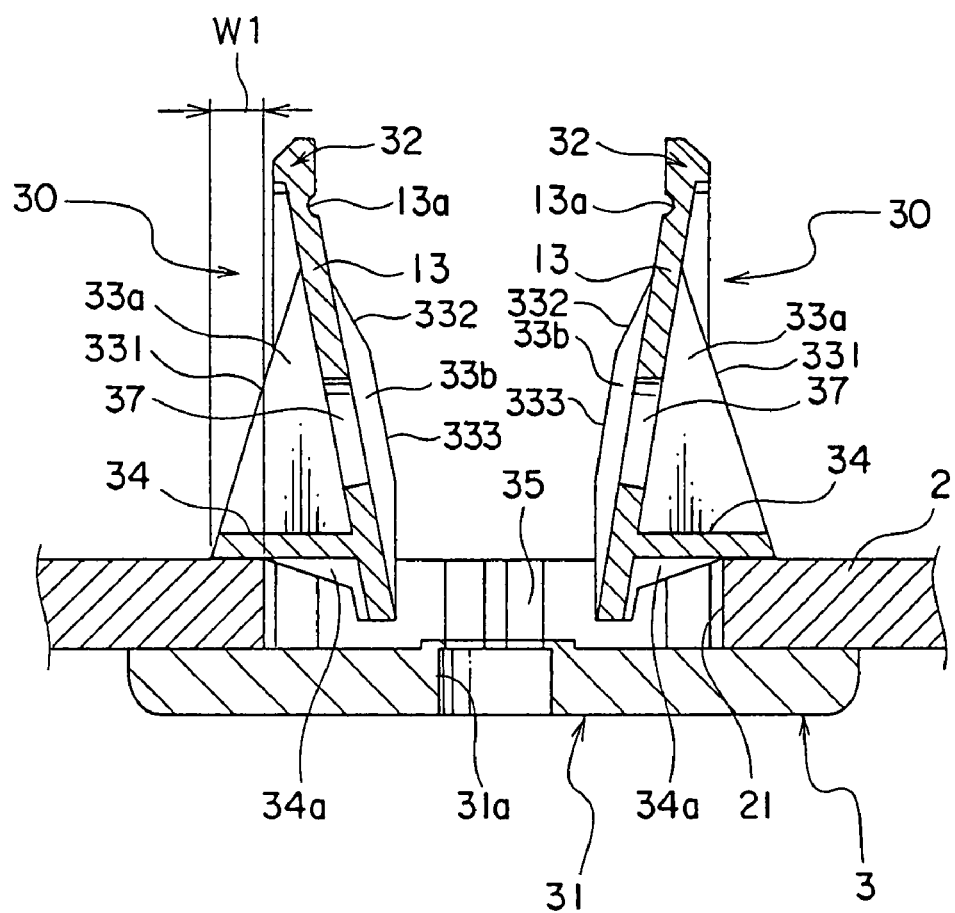
FIG. 7 is a sectional view showing the first part shown in FIG. 4 temporarily locked on an attaching hole of a panel.

When the pair of flat parts 13 is bent in a direction of approaching each other around the connecting part 13a, an outer edge of the later-described movable piece 33, namely, an outer edge of the vertically extending part 30 is positioned inside the attaching hole 21, so that the movable piece 33, namely, the vertically extending part 30 is inserted into the attaching hole 21. Thus, the pair of flat part 13 is inserted into the attaching hole 21 and positioned at a rear side of the attaching hole 21. Then, when the pair of flat parts 13 is moved in a direction of separating each other around the connecting part 13a owing to resilient restoring force, the outer edge of the later-described movable piece 33, namely, the outer edge of the vertically extending part 30 is positioned outside of the attaching hole 21, so that, as shown in FIG. 7, the design part 3 is temporarily locked on the attaching hole 21.

Figure 8:
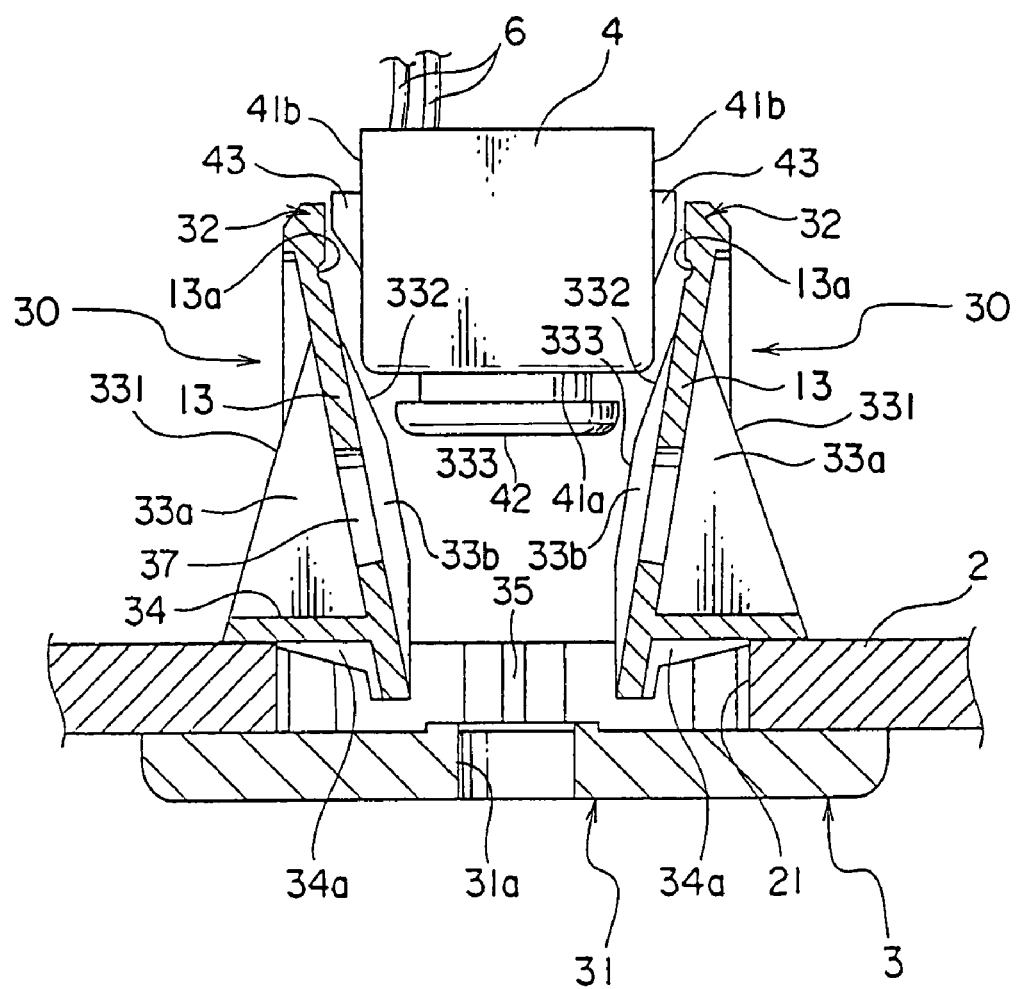
FIG. 8 is a sectional view showing the second parts shown in FIG. 3 assembled with the first part temporarily locked on the panel shown in FIG. 7.
Figure 9:
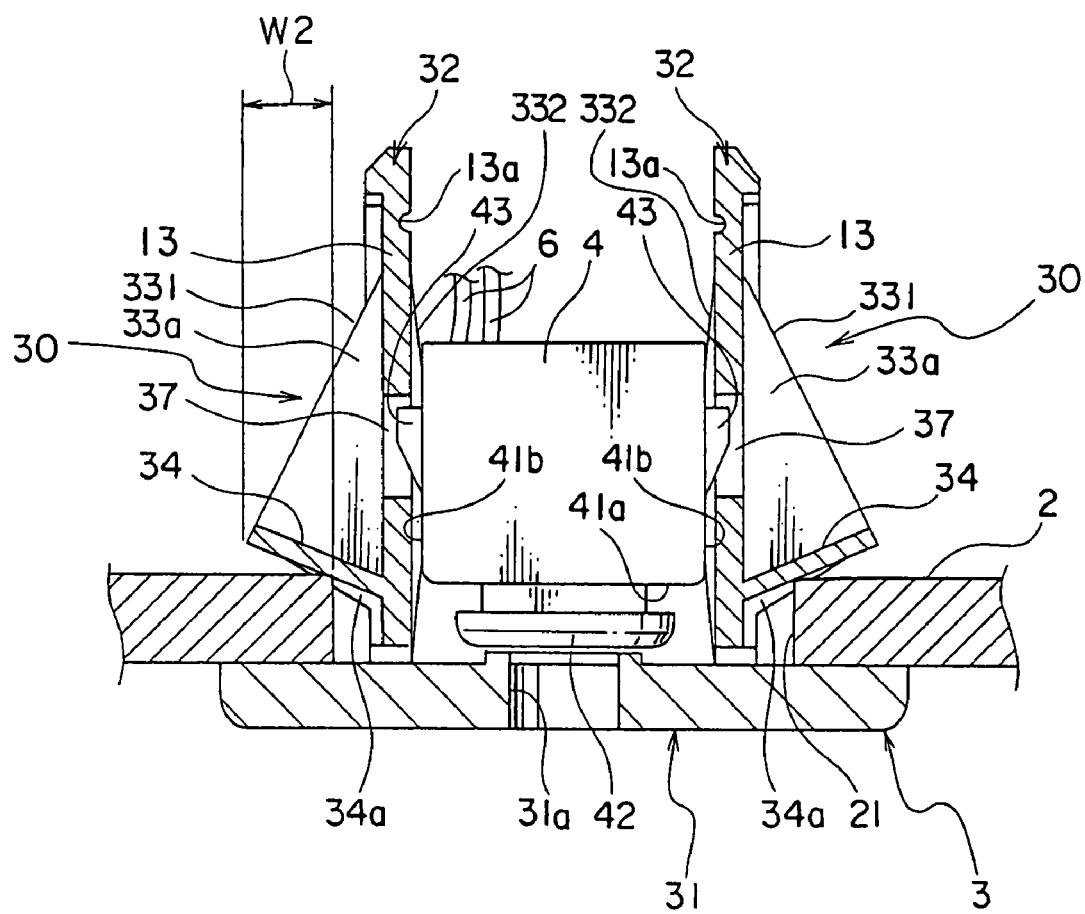
FIG. 9 is a sectional view showing the second part shown in FIG. 8 assembled with the first part, and the first part permanently locked on the attaching hole of the panel.

A locking hole 37 is formed on the center of the flat part 13. The locking hole 37 is to be engaged with the locking projection 43 of the function part 4 for fixing the function part 4 to the design part 3. As shown in FIGS. 8 and 9, while the design part 3 is temporarily locked on the attaching hole 21, the function part 4 is positioned between the pair of flat parts 13. At this time, when the pair of flat parts 13 at the plate part 31 side is pushed to be extended outward, the pair of flat parts 13 is bent around the connecting part 13a in a direction of separating each other, so that the outer edge of the later-described movable piece 33, namely, the outer edge of the attaching hole 21 is positioned further outside of the attaching hole 21. Thus, as shown in FIG. 9, the design part 3 is permanently locked on the attaching hole 21.

The clamping part 34 is formed in a plate shape, vertically extended from the flat part 13 at a far side of the other flat part 13, and vertically extended from an end away from the connecting part 13a. Further, the clamping part 34 is disposed in a direction of facing the plate part 31. While the design part 3 is temporarily locked on the attaching hole 21, an outer edge (corresponding to an outer edge in claim) of the clamping part 34 away from the flat part 13 is positioned outside of the attaching hole 21, and the edge of the attaching hole 21 is interposed between the clamping part 34 and the plate part 31.

Namely, the outer edge of the clamping part 34 constitutes the outer edge of the movable piece 33 and the outer edge of the vertically extending part 30. Further, according to the present invention, the outer edge of the movable piece 33 means the most outside portion of the movable piece 33 in a direction of the pair of movable pieces 33 facing each other. Further, the outer edge of the vertically extending part 30 means the most outside portion of the vertically extending part 30 in a direction of the pair of vertically extending parts 30 facing each other.

As shown in FIG. 6, the pair of ribs 34a is extended vertically from the clamping part 34 facing the plate part 31, and respectively extended vertically from both ends of the clamping part 34 along a width direction of the clamping part 34 with a gap. Here, the width direction of the clamping part 34 means a direction perpendicular to a direction of the pair of vertically extending part 30 facing each other. The pair of ribs 34a is extended straight from the outer edge of the clamping part 34 toward the flat part 13. Extending length of the pair of ribs 34a is decreased from the flat part 13 toward the outer edge. Namely, as shown in FIG. 9, while the design part 3 is permanently locked on the attaching hole 21, the edge of the rib 34a away from the clamping part 34 is further away from the plate part 31 as the rib 34a is away from the flat part 13, namely, as the rib 34a extends from the inside to the outside of the attaching hole 21.

When the design part 3 temporarily locked on the attaching hole 21 is permanently locked on the attaching hole 21, the pair of ribs 34a breaks into an inner edge at the rear side of the attaching hole 21. Thus, the design part 3 is drawn toward the roof trim 2 against the attaching hole 21 to be prevented from rattling. The inner edge of the attaching hole 21 means an end wall of the roof trim 2 having the attaching hole 21, perpendicular to a planar direction of the roof trim 2.

The pair of first guiding walls 33a is formed in a triangle plate shape from a plan view, and disposed having a gap between each other. The pair of first guiding walls 33a connects a surface on the flat part 13 away from the other flat part 13 to both ends along the width direction of the clamping part 34. While the movable piece 33 is not pressed, the first guiding wall 33a includes a slope wall 331 which inclined further outward of the vertically extending part 30 as the slope wall 331 extends from the connecting part 13a toward the clamping part 34. When the vertically extending part 30 is inserted into the attaching hole 21, the slope wall 331 of the first guiding walls 33a slides on the inner edge of the attaching hole 21 to bend the pair of movable piece 33 in a direction of approaching each other. Further, the first guiding walls 33a reinforce strength of the clamping part 34.

The pair of second guiding walls 33b vertically extends from the flat part 13 facing the other flat part 13 in a width direction of the clamping part 34, and having a gap interposed between each other. The pair of second guiding walls 33b is extended from the connecting part 13a toward the plate part 31. As shown in FIG. 7, the second guiding wall 33b includes a slope wall 332 on an end wall of the second guiding wall 33b away from the flat part 13, and an abutting wall 333 continued to the slope wall 332. The slope wall 332 is disposed near the connecting part 13a, and inclined to approach the movable piece 33 as the slope wall 332 extends from the connecting part 13a toward the plate part 31. The abutting wall 333 is disposed nearer the plate part 31 than the slope wall 332. The abutting wall 333 abuts on the sidewall 41b of the function part 4 while the function part 4 is assembled with the design part 3. While the design part 3 is temporarily locked on the attaching hole 21, a gap between the abutting walls 333 of the pair of second guiding walls 33b facing each other is formed smaller than a width between the pair of sidewalls 41b of the function part 4.

The pair of sidewalls 41b of the function part 4 slides on the pair of slope walls 332 toward the abutting walls 333. As the sidewalls 41b approach the abutting walls 333, the sidewalls 41b bend the pair of movable piece 33 in a direction of separating each other, and are gradually pushed into between the abutting walls 333. When the locking projections 43 are engaged with the locking holes 37, the function part 4 is fixed between the pair of movable piece 33. In this state, the pair of sidewalls 41b respectively abuts on the abutting walls 333.

The rib 36 vertically extends from the upright part 11 of the frame part 32 toward a width direction of the clamping part 34, and extends along a longitudinal direction of the upright part 11. An end of the rib 36 in the longitudinal direction is continued to the plate part 31. While the design part 3 is permanently locked on the attaching hole 21, the rib 36 breaks into the inner edge of the attaching hole 21 to prevent the design part 3 from rattling against the attaching hole 21. Further, the rib 36 reinforces strength of the frame part 32.

The function part positioning part 35 is vertically extended from the plate part 31. While the design part 3 is permanently locked on the attaching hole 21, the function part positioning part 35 is positioned at the rear side of the attaching hole 21, namely, the ceiling side. Further, a shape of the function part positioning part 35 is along an outer shape of the housing 40 of the function part 4. When the function part positioning part 35 abuts on the housing 40, the function part positioning part 35 positions the housing 40 at a predetermined position.

Next, a method to attach the lamp unit 5 to the attaching hole 21 of the roof trim 2 will be explained with reference to FIGS. 7 to 9.

First, the design part 3 separated from the function part 4 is pushed up from the cabin toward the ceiling while the vertically extending part 30 is directed to the ceiling, and the pair of vertically extending parts 30 is inserted into the attaching hole 21. Then, as shown in FIG. 7, the design part 3 is temporarily locked on the attaching hole 21.

At this time, because the slope wall 331 of the first guiding wall 33a slides on the inner edge of the attaching hole 21, the pair of movable piece 33 is bent around the connecting part 13a in a direction of approaching each other, and the outer edge of the clamping part 34 is positioned inside the attaching hole 21, so that the pair of vertically extending part 30 is inserted into the attaching hole 21. Incidentally, in the present invention, a state where the outer edge of the clamping part 34 is positioned inside the attaching hole 21 is expressed as that the vertically extending part 30 is positioned at an insertion position.

Then, the pair of movable piece 33 is moved in a direction of separating each other owing to the resilient restoring force, and the outer edges of the clamping parts 34 are respectively positioned outside the attaching hole 21. Then, the design part 3 is temporarily locked on the attaching hole 21 while the edge of the attaching hole 21 is caught between the clamping part 34 and the plate part 31. In the temporary locking state, the pair of vertically extending part 30 is bent in a direction of approaching each other, and as shown in FIG. 7, there is a locking margin W1 between the clamping part 34 and the edge of the attaching hole 21. In the present invention, a state that the locking margin W1 exists is expressed by that the vertically extending part 30 is positioned at a temporary locking position.

Next, as shown in FIG. 8, the function part 4 is inserted into between the pair of vertically extending part 30 which is temporarily locked on the attaching hole 21. At this time, the pair of sidewalls 41b of the function part 4 is guided toward plate part 31 while sliding on the slope walls 332. Then, the function part 4 is inserted and the gap between the abutting walls 333 is pushed to be extended outward, so that the clamping part 34 having the locking margin W1 is further shifted outward.

Then, by further pushing the function part 4, as shown in FIG. 9, the locking projections 43 of the function part 4 is engaged with the locking hole 37 of the movable piece 33, and the function part 4 is assembled with the design part 3. In this state, the abutting wall 333 resiliently abuts on the sidewall 41b of the function part 4. Then, when the function part 4 is assembled with the design part 3, there is a locking margin W2, and the design part 3, namely, the lamp unit 5 is permanently locked on the attaching hole 21.

Further, while the design part 3 is permanently locked on the attaching hole 21, the rib 34a breaks into the inner edge at the rear side of the attaching hole 21 to prevent the design part 3 from rattling along a direction of the pair of vertically extending parts 30 facing each other, and a thickness direction of the roof trim 2. Further, the function part positioning part 35 and the outer edge of the rib 36 break into the inner edge of the attaching hole 21 to prevent the design part 3 from rattling in a direction perpendicular to the direction of the pair of vertically extending part 30 facing each other. In the present invention, a state that the locking margin W2 exists is expressed by that the vertically extending part 30 is positioned at the permanent locking position.

According to the present embodiment, when the function part 4 is assembled with the design part 3, the locking margin between the outer edge f the clamping part 34 and the inner edge of the attaching hole 21 is increased from the temporary locking margin W1 to the permanent locking margin W2. Therefore, the pair of vertically extending part 30 is inserted into the attaching hole 21 with low insertion force to be temporarily locked, and owing to the permanent locking state, sufficient holding force of the edge of the attaching hole 21 is secured. Accordingly, the lamp unit 5 is surely prevented from falling out of the attaching hole 21.

Because the movable piece 33 is bent, the vertically extending part 30 is movable from the temporary locking position to the permanent locking position. Therefore, it is unnecessary to provide a temporary locking member and a permanent locking member respectively, and the design part 3 can be downsized. Further, a structure of the design part 3 can be simplified.

Because the thickness of the connecting part 13a is thinner than the other part, the movable piece 33 can be bent with a little force, and the pair of vertically extending parts 30 can be inserted into the attaching hole 21 with low insertion force. Further, when the function part 4 is inserted into between the pair of movable piece 33, sliding resistance of the second guiding walls 33b is reduced, and the function part 4 is inserted with less insertion force.

The vertically extending part 30 includes the rib 34a as the sliding part for breaking into the inner edge at the rear side of the attaching hole 21 when the design part 3 is permanently locked on the attaching hole 21. Therefore, the design part 3, namely, the lamp unit 5 can be attached to the attaching hole 21 without rattle.

Because the first guiding wall 33a is provided, when the vertically extending part 30 is inserted into the attaching hole 21, the design part 3 is only pushed toward the ceiling. Then, the pair of movable piece 33 is bent in a direction of approaching each other, and then returned in a direction of separating each other to be the temporary locking position. Further, because the slope wall 332 of the second guiding wall 33b is provided, only pushing the function part 4 vertically makes the function part 4 assembled with the design part 3 easily. Thus, according to the attaching structure 1A, the lamp unit 5 can be attached to the attaching hole 21 with a straight and simple operation. Therefore, assembling workability is good, and the attaching operation can be automated.

Because the vertically extending part 30 includes the frame part 32 which is hardly resiliently deformed, solidity of the design part 3 can be increased. Further, a positioning to inserting the vertically extending part 30 into the attaching hole 21 can be accurate. When the frame part 32 is formed in agreement with a size of the attaching hole 21, it is hard to rattle between the frame part 32 and the attaching hole 21.

Next, an attaching structure 1A' which is a modified example of the attaching structure 1A will be explained with reference to FIG. 10.

Figure 10:
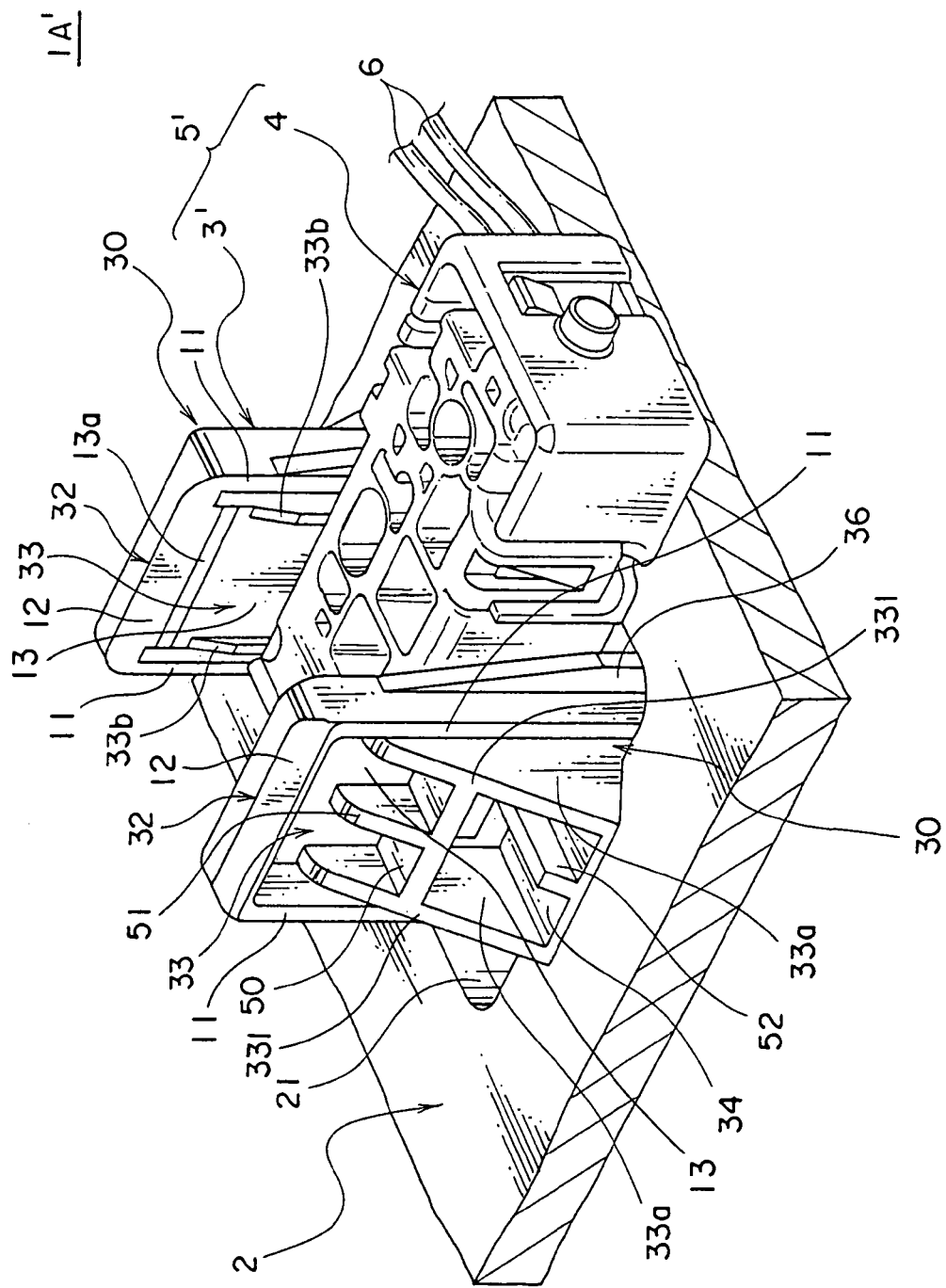
FIG. 10 is a perspective view showing a modified example of the attaching structure according to the first embodiment of the present invention.

In the attaching structure 1A' shown in FIG. 10, the vertically extending part 30 of the attaching structure 1A further includes ribs 50, 51, 52. The rib 50 connects a pair of first guiding walls 33a to reinforce strength of the first guiding walls 33a. The rib 51 is formed crossing the center of the rib 50 to reinforce strength of the first guiding walls 33a. The rib 52 is formed in the center of the clamping part 34 in the width direction and extended from an outer edge of the clamping part 34 toward an end of the flat part 13 to reinforce strength of the clamping part 34. The design part 3' reinforced by the ribs 50, 51, 52 has better dignity and better endurance than the design part 3 of the attaching structure 1A.

Next, an attaching structure 1B according to a second embodiment of the present invention will be explained with reference to FIGS. 11 to 14.

Figure 11:
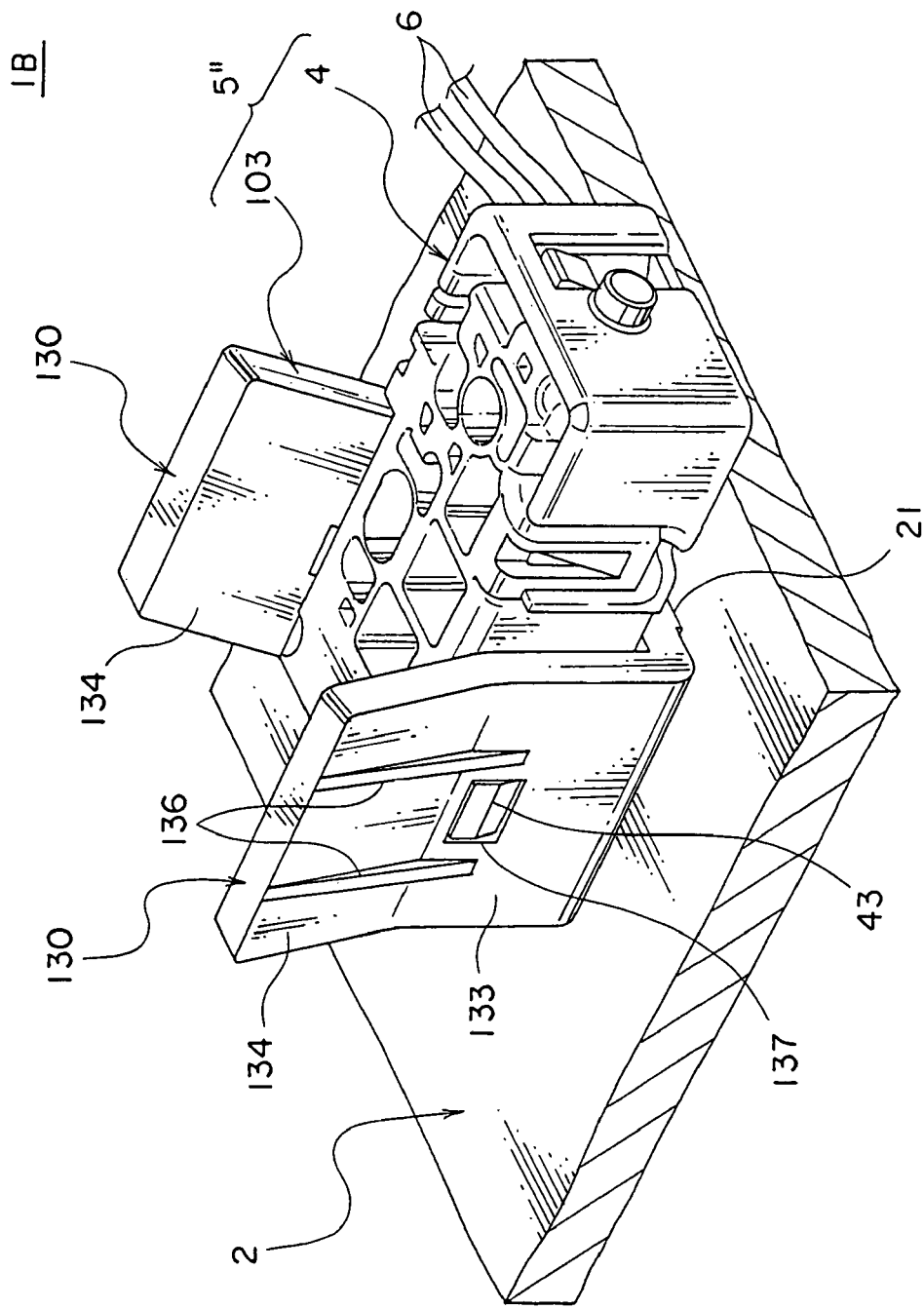
FIG. 11 is a perspective view showing an attaching structure according to a second embodiment of the present invention.

As shown in FIG. 11, in the attaching structure 1B, a room lighting system for a vehicle (hereunder referred to as lamp unit 5") as the attaching object is attached to the attaching hole 21 formed on the roof trim 2 of the vehicle as the panel. The lamp unit 5" is identical to those in the attaching structures 1A, 1A' except a design part 103.

The design part 103 is made of resilient synthetic resin, and includes: the plate part 31 composing the outside appearance; and a pair of vertically extending parts 130 facing each other, and vertically extended from the plate part 31 to be positioned at the rear side of the attaching hole 21, namely, the ceiling side.

Each vertically extending part 130 includes: a connecting part 132 vertically extended from the plate part 31; a main part 133 continued to the connecting part 132 at a far side from the plate part 31; a guiding part 134 continued to the main part 133 at a far side from the plate part 31; and a rib 135 as a slope part.

A thickness of the connecting part 132 is formed thinner than those of the plate part 31 and the main part 133. Therefore, the vertically extending part 130 is to be bent around the connecting part 132 in directions of approaching and separating from the other vertically extending part 130.

The main part 133 includes: a first main part 133a continued to the connecting part 132, and extended in a direction of separating from the other vertically extending part 130; and a second main part 133b formed in a plate shape, continued to an end of the first main part 133a at a far side from the connecting part 132, and extended in a direction of crossing the first main part 133a.

A locking hole 137 configured to be engaged with the locking projection 43 of the function part 4 and fix the function part 4 onto the design part 3 is formed on the second main part 133b. The second main part 133b is so inclined that a gap between the pair of second main parts 133b is reduced as the second main part 133b extends from the first main part 133a to the guiding part 134, while the vertically extending parts 130 are not pushed and the design part 103 is temporarily locked on the attaching hole 21. Further, while the vertically extending parts 130 are not pushed and the design part 103 is temporarily locked on the attaching hole 21, the gap between the second main parts 133b is formed smaller than a gap between the pair of sidewalls 41b of the function part 4.

The pair of vertically extending parts 130 of the main part 133 is bent around the connecting part 132 in a direction of separating each other to position the function part 4 between the pair of main parts 133. At this time, the bottom wall 41a having the translucent window 42 of the function part 4 abuts on the first main part 133a, and the sidewall 41b having the locking projections 43 abuts on the second main part 133b.

The guiding part 134 is formed in a plate shape, and inclined against the second main part 133b. Also, the guiding part 134 is so inclined to be disposed further away from the other vertically extending part 130 as the guiding part 134 is disposed further away from the second main part 133b. A gap between the pair of guiding parts 134 at the far ends from the main parts 133 is larger than a gap between the pair of sidewalls 41b of the function part 4 while the design part 103 is temporarily locked on the attaching hole 21 (see FIG. 13).

The pair of sidewalls 41b of the function part 4 slides on surfaces facing each other of the pair of guiding part 134 toward the second main part 133b. As the pair of sidewalls 41b approaches the second main part 133b, while bending the pair of vertically extending parts 130 in a direction of separating each other, the pair of sidewalls 41b is gradually pushed into between the second main parts 133b. Then, when the locking projections 43 is engaged with the locking hole 137, the pair of sidewalls 41b is fixed between the pair of second main part 133b. Under this condition, the pair of sidewalls 41b respectively abuts on the second main parts 133b.

As shown in FIG. 11, ribs 136 reinforce strength of the guiding part 134.

The rib 135 is extended vertically from a surface facing the plate part 31 of the first main part 133a. The rib 135 is extended straight from an outer edge of the first main part 133a toward the connecting part 132. While the design part 103 is permanently locked on the attaching hole 21 (see FIG. 14), the rib 135 is so inclined that as the an edge of the rib 135 away from the first main part 133a is removed from the connecting part 132, namely, extended from the inside to the outside of the attaching hole 21, the rib 135 is removed from the plate part 31. When the design part 103 is permanently locked from a state that the design part 103 is temporarily locked on the attaching hole 21 (see FIG. 13), the rib 135 breaks into the inner edge of the attaching hole 21 at the rear side thereof to prevent the design part 103 from rattling against the attaching hole 21.

Figure 13:
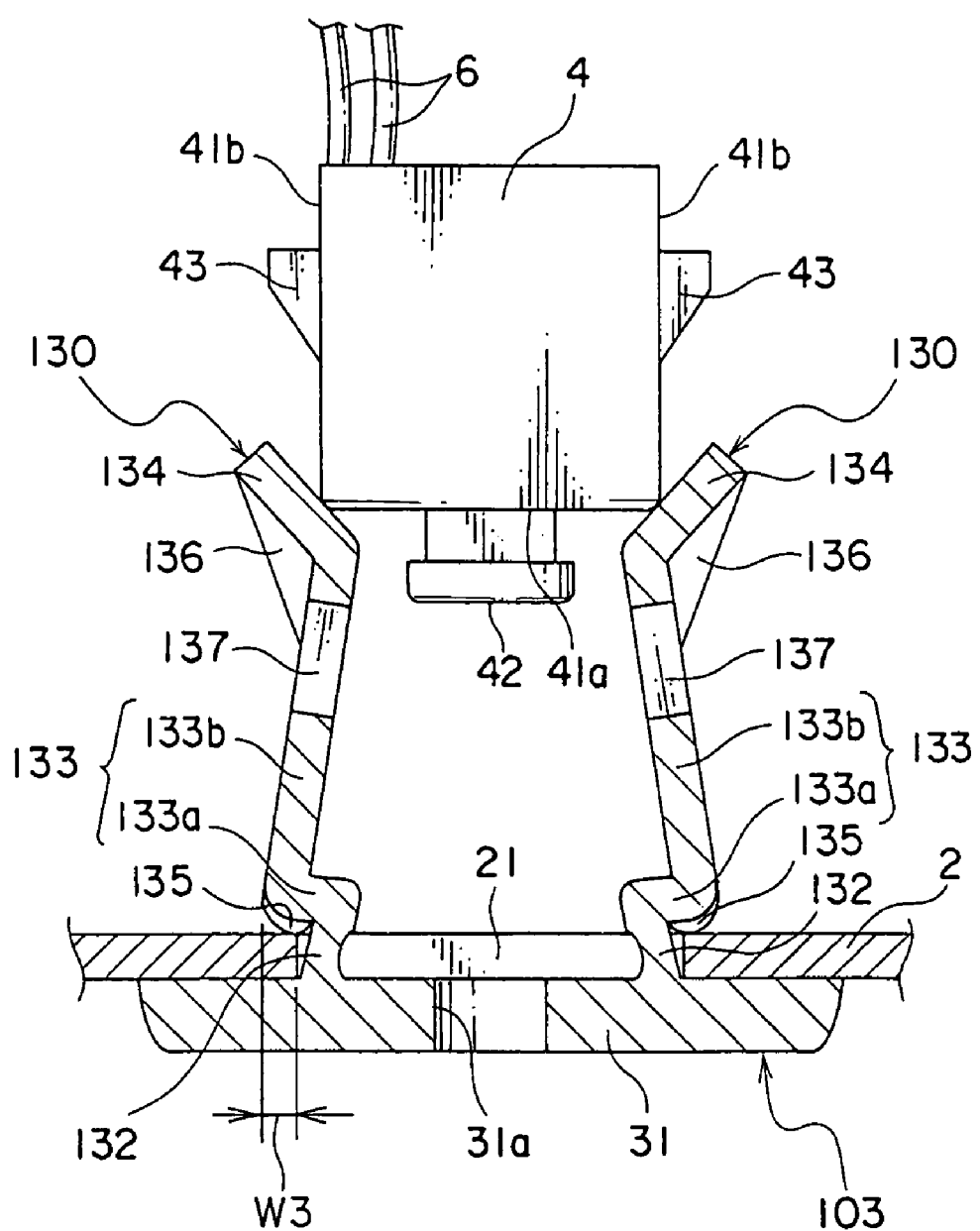
FIG. 13 is a sectional view showing a second part composing the attaching object of the attaching structure shown in FIG. 11 assembled with the first part temporarily locked on the attaching hole of the panel.
Figure 14:
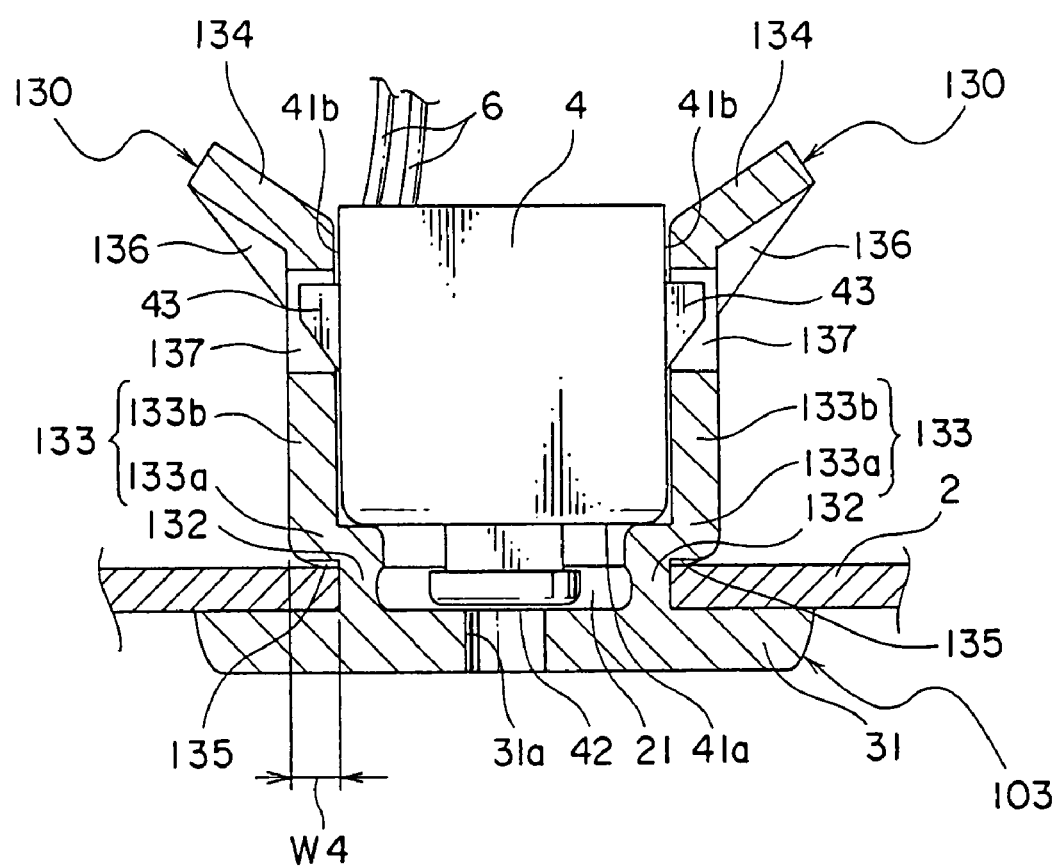
FIG. 14 is a sectional view showing the second part shown in FIG. 13 assembled with the first part, and the first part permanently locked on the attaching hole of the panel.

When the pair of vertically extending parts 130 is bent around the connecting part 132 in a direction of approaching each other, the first main part 133a as an outer edge of the vertically extending part 130 is positioned at an inside of the attaching hole 21, namely, at the insertion position to be inserted into the attaching hole 21. Then, the vertically extending parts 130 is moved around the connecting part 132 in a direction of separating each other owing to the resilient restoring force, and the first main part 133a is positioned at an outside of the attaching hole 21, namely, at the temporary locking position, and then, as shown in FIG. 13, the design part 103 is temporarily locked on the attaching hole 21. Then, when the function part 4 is positioned between the second main parts 133b, the function part 4 pushes the pair of vertically extending parts 130. Then, the pair of vertically extending parts 130 is bent around the connecting part 132 in a direction of separating each other, and the first main part 133*a* is positioned at the further outside of the attaching hole 21, namely, at the permanent locking position, so that the design part 103 is permanently locked on the attaching hole 21 as shown in FIG. 14. Further, while the design part 103 is temporarily or permanently locked on the attaching hole 21, the edge of the attaching hole 21 is caught between the first main part 133*a* and the plate part 31.

Next, a method to attach the lamp unit 5" to the attaching hole 21 of the roof trim 2 will be explained with reference to FIGS. 12 to 14.

Figure 12:
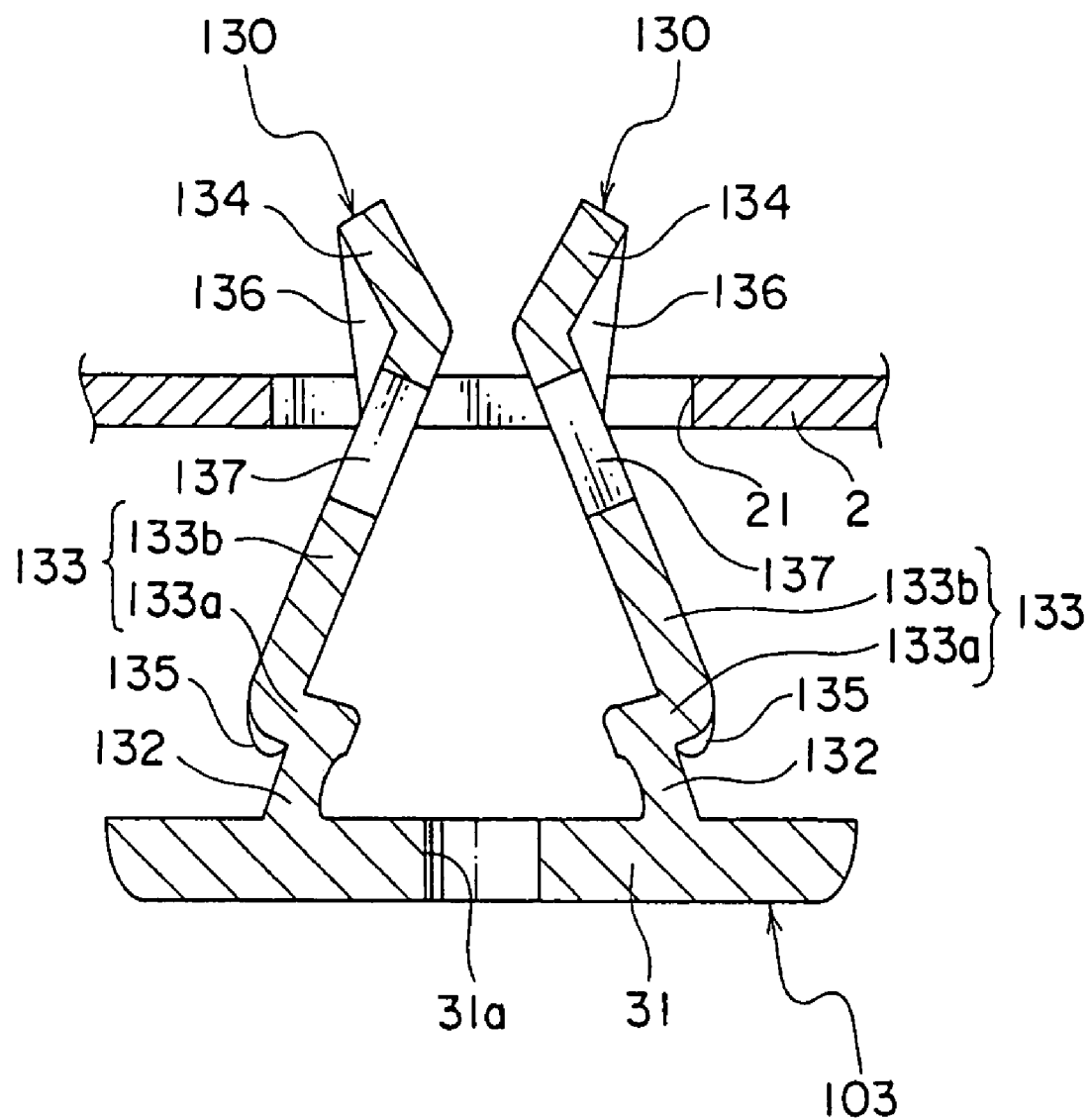
FIG. 12 is a sectional view showing a first part composing the attaching object of the attaching structure shown in FIG. 11 attached to the attaching hole of the panel.

First, as shown in FIG. 12, the pair of vertically extending parts 130 of the design part 103 removed from the function part 4 is bent in a direction of approaching each other, so that the pair of vertically extending parts 130 is shifted to the insertion position where the first main part 133*a* is positioned at an inside of the attaching hole 21. Further, from this condition, the design part 103 is pushed from the cabin side toward the ceiling side, so that the design part 103 is temporarily locked on the attaching hole 21 as shown in FIG. 13. In the temporarily locked condition, the pair of vertically extending parts 130 is bent in a direction of approaching each other, and there is a locking margin W3 between the first main part 133*a* and the edge of the attaching hole 21.

Next, as shown in FIG. 13, the function part 4 having the wiring harness 6 is inserted into between the pair of vertically extending parts 130 of the design part 103 temporarily locked on the attaching hole 21. At this time, the pair of sidewalls 41*b* of the function part 4 slides on the guiding part 134 to be guided toward the second main part 133*b*. Then, when the function part 4 is inserted to push the gap between the second main parts 133*b*, the first main part 133*a* is moved to the further outside of the attaching hole 21.

Then, when the function part 4 is further pushed into between the second main parts 133*b*, as shown in FIG. 14, the locking projection 43 of the function part 4 is engaged with the locking hole 137 of the movable piece 33, so that the function part 4 is assembled with the design part 103. Under this condition, the second main part 133*b* resiliently contacts the sidewalls 41*b* of the function part 4. Then, when the function part 4 is assembled with the design part 103, the first main part 133*a* is positioned at a position where the locking margin with the edge of the attaching hole 21 becomes W4, and the design part 103, namely, the lamp unit 5" is permanently locked on the attaching hole 21.

While the design part 103 is permanently locked on the attaching hole 21, the rib 135 breaks into the inner edge of the attaching hole 21 at the rear side to prevent the design part 103 from rattling in the direction of the pair of vertically extending parts 130 facing each other.

According to this embodiment, when the function part 4 is assembled with the design part 103, the locking margin between the first main part 133*a* and the edge of the attaching hole 21 is increased from W3 at the temporary locking to W4 at the permanent locking. Therefore, the pair of vertically extending parts 130 can be inserted into the attaching hole 21 to be temporarily locked with low insertion force. Further, owing to the permanent locking after the temporary locking, a sufficient holding force for holding the edge of the attaching hole 21 is secured.

Further, because the guiding part 134 is provided, only pushing the function part 4 in a vertical direction makes the function part 4 assembled with the design part 103.

Further, because the design part 103 according to the attaching structure 1B of this embodiment is simpler than the design parts 3, 3' of the attaching structures 1A, 1A', the cost of the lamp unit 5" is lower than those of the lamp units 5, 5'.

Next, an attaching structure 1C according to a third embodiment of the present invention will be explained with reference to FIGS. 15 to 20.

Figure 15:
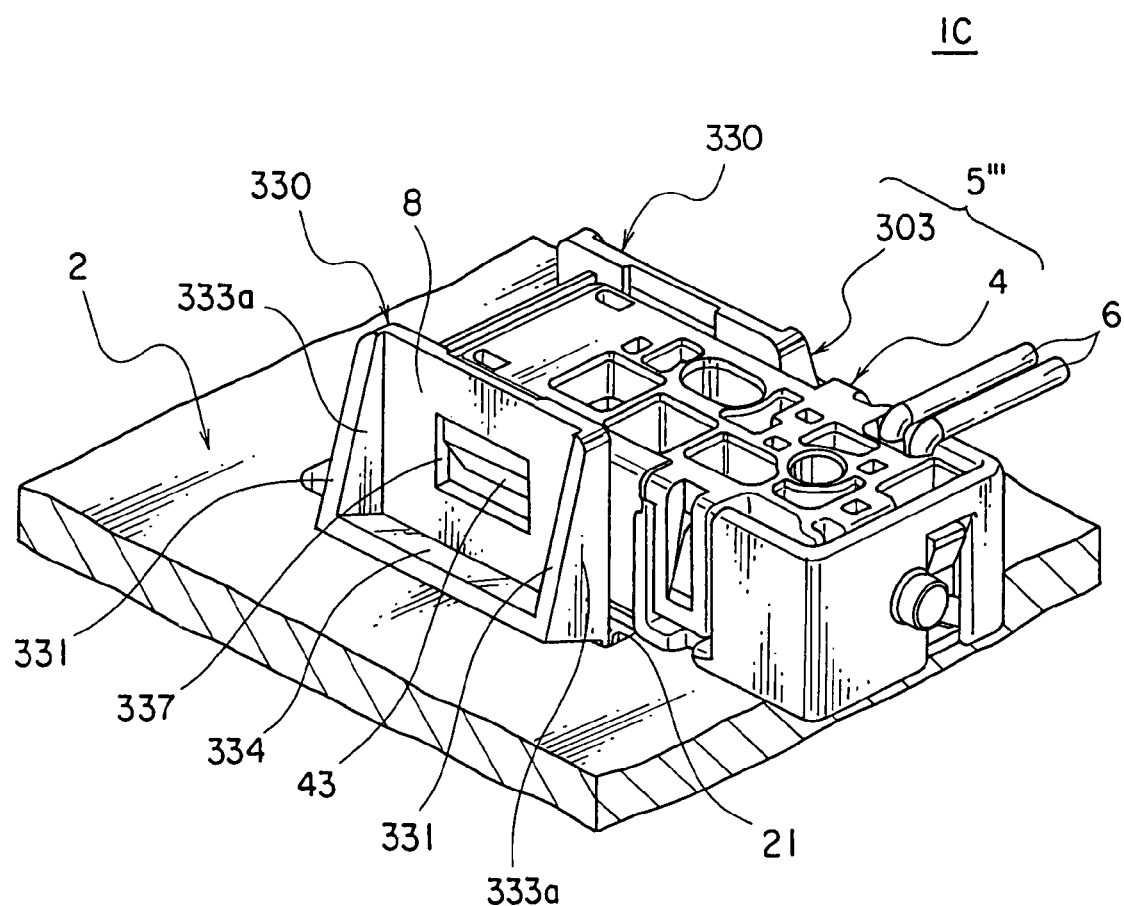
FIG. 15 is a perspective view showing an attaching structure according to a third embodiment of the present invention.

As shown in FIG. 15, the attaching structure 1C is a structure for attaching a room lighting system (hereafter referred to as a lamp unit 5''') as the attaching object to the attaching hole 21 formed on the roof trim 2 of a vehicle as the panel. The lamp unit 5''' is the same as those in the attaching structure 1A, 1A', 1B except the design part 303, namely, the function part 4.

Figure 16:
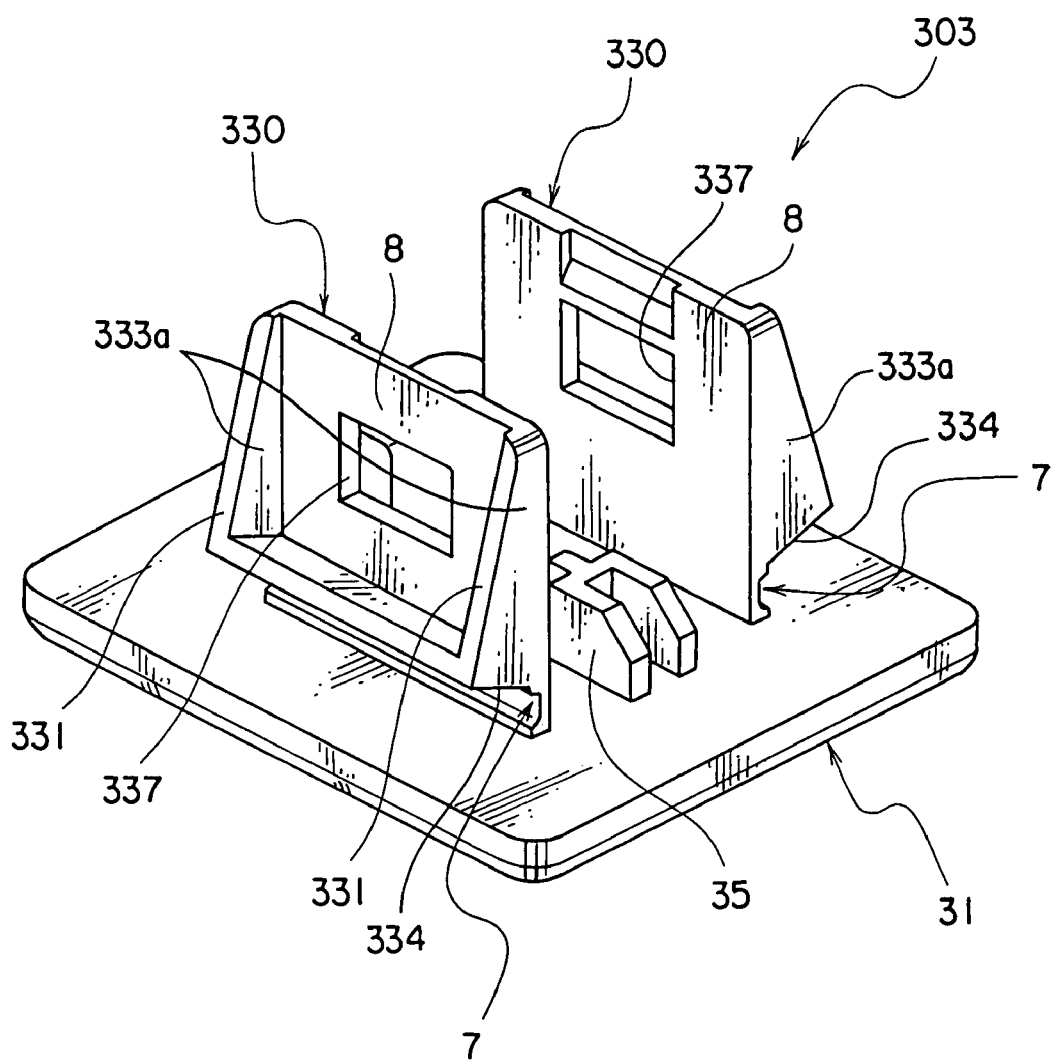
FIG. 16 is a perspective view showing a first part composing the attaching object of the attaching structure shown in FIG. 15.
Figure 17:
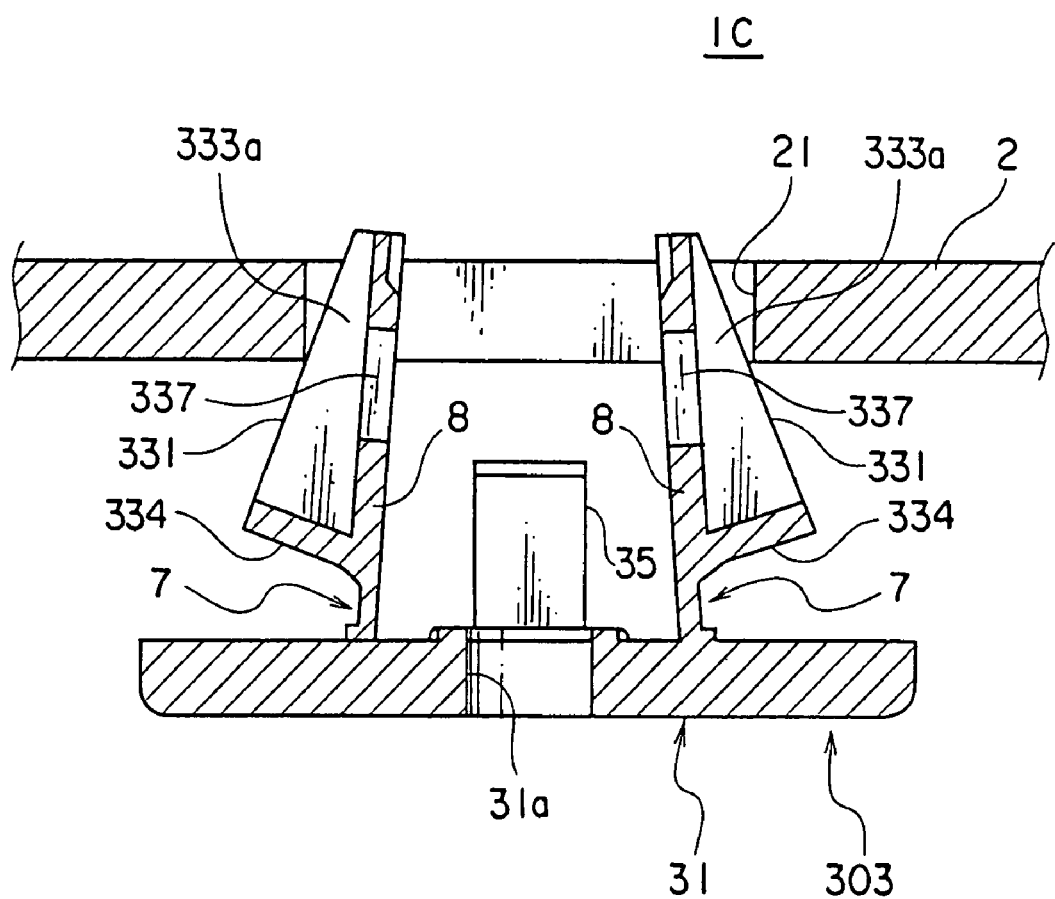
FIG. 17 is a sectional view showing the first part shown in FIG. 6 attached to the attaching hole of the panel.

The design part 303 is made of resilient synthetic resin. As shown in FIG. 16, the design part 303 includes: the plate part 31 composing the outside appearance of the lamp unit 5'''; a pair of vertically extending parts 330 facing each other, and vertically extended from the plate part 31 to be positioned at the rear side of the attaching hole 21, namely, the ceiling side; and the function part positioning part 35.

Each vertically extending part 330 includes: a main part 8 vertically extended from the plate part 31; a clamping part 334 vertically extended from the main part 8 as a slope part; and a pair of guiding parts 333*a*.

The main part 8 is formed in a plate shape. The main part 8 is formed in a direction to be parallel with the other main part 8 facing each other while the vertically extending parts 330 are not pushed. Further, while the vertically extending parts 330 are not pressed, and the design part 303 is temporarily locked on the attaching hole 21, a gap between the main parts 8 facing each other is smaller than a width between the pair of sidewalls 41*b* of the function part 4.

A connecting part 7 of the main part 8 connected to the plate part 31, namely, an end of the main part 8 disposed at the plate part 31 side is thinner than the other parts of the main part 8. Namely, the connecting part 7 is thinner than the parts of the main part 8 at a far side from the connecting part 7. Namely, the main part 8 is so formed as to bend around the connecting part 7 in directions of approaching and separating from the other main part 8.

Figure 18:
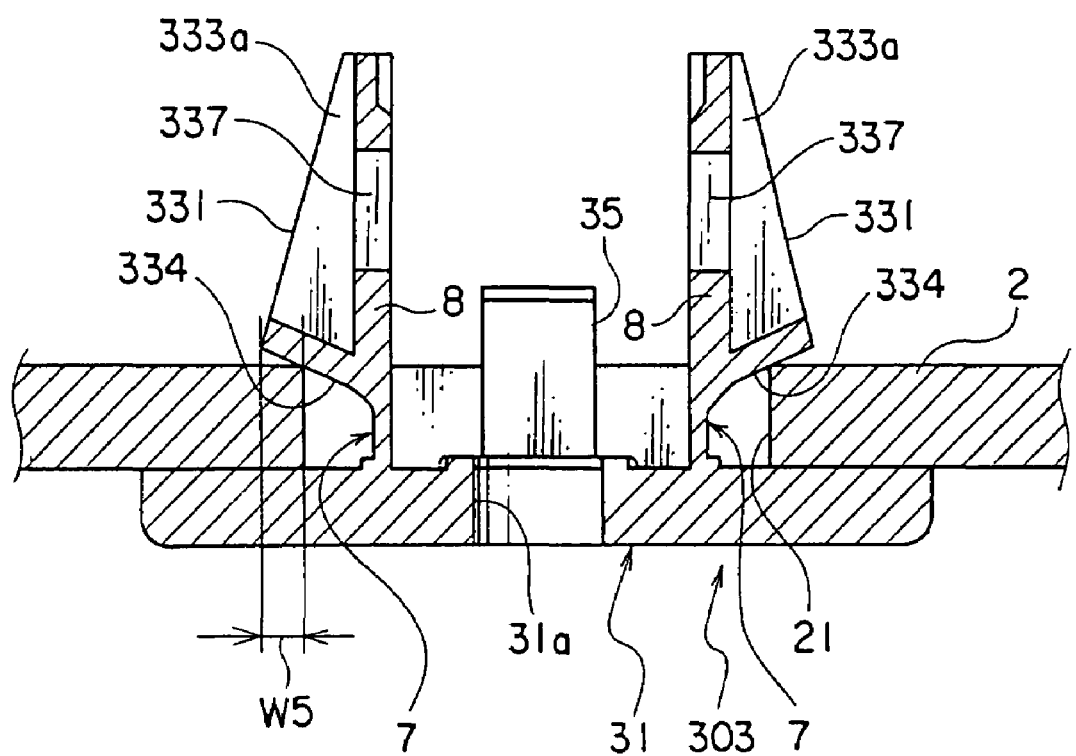
FIG. 18 is a sectional view showing the first part shown in FIG. 7 temporarily locked on the attaching hole of the panel.

When the pair of the main parts 8 is bent around the connecting part 7 in a direction of approaching each other, outer edges of the later-described clamping parts 334, namely, outer edges of the vertically extending parts 330 are positioned inside the attaching hole 21, and the clamping parts 334, namely, the vertically extending parts 330 are inserted into the attaching hole 21. Then, the pair of main parts 8 inserted into the attaching hole 21 and positioned at the rear side of the attaching hole 21 is moved around the connecting part 7 in a direction of separating each other owing to the resilient restoring force thereof. Therefore, the outer edges of the later-described clamping parts 334, namely, the outer edges of the vertically extending parts 330 are positioned outside the attaching hole 21, and as shown in FIG. 18, the design part 303 is temporarily locked on the attaching hole 21.

Figure 19:
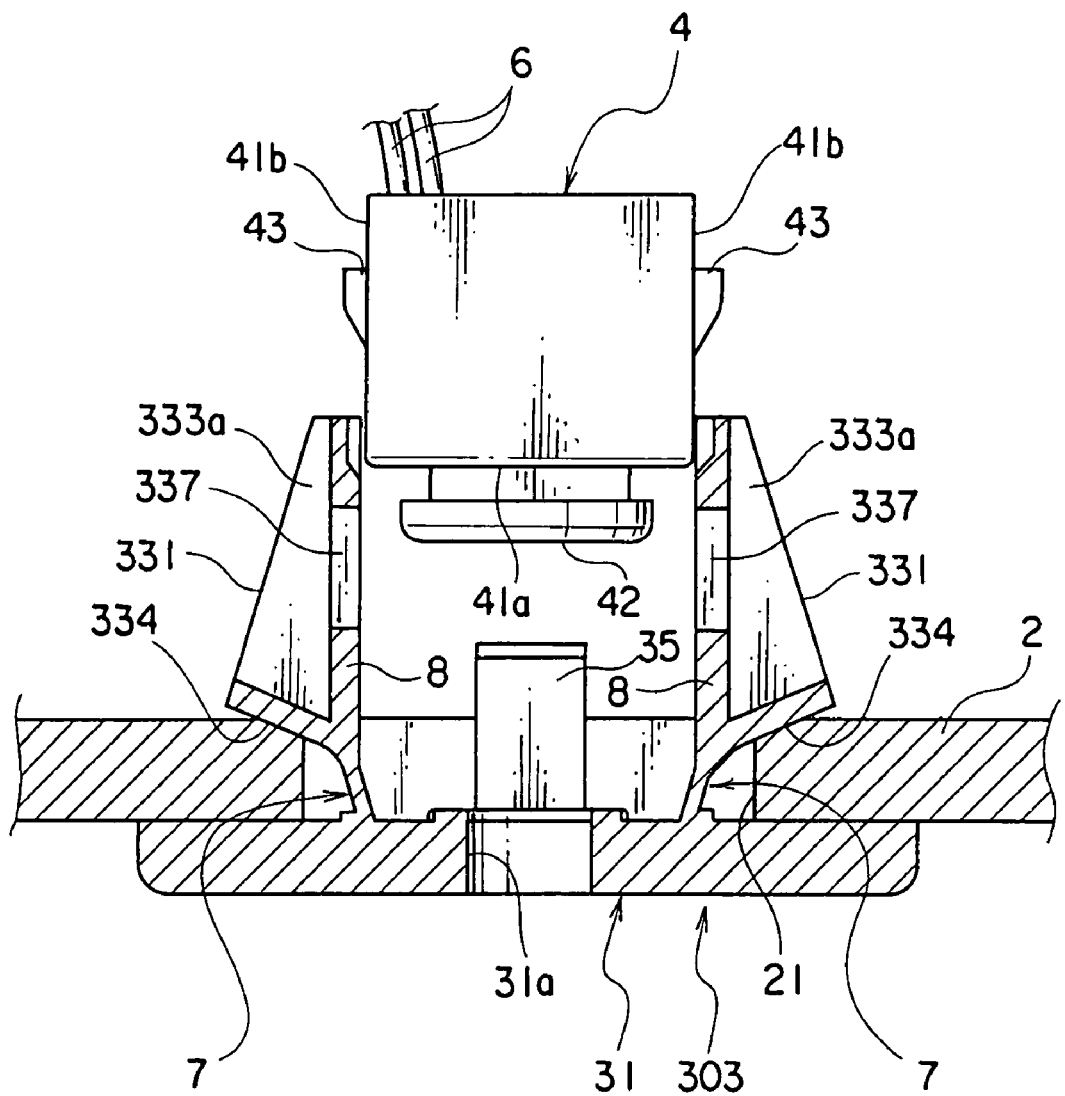
FIG. 19 is a sectional view showing a second part composing the attaching object of the attaching structure shown in FIG. 15 assembled with the first part temporarily locked on the attaching hole of the panel.
Figure 20:
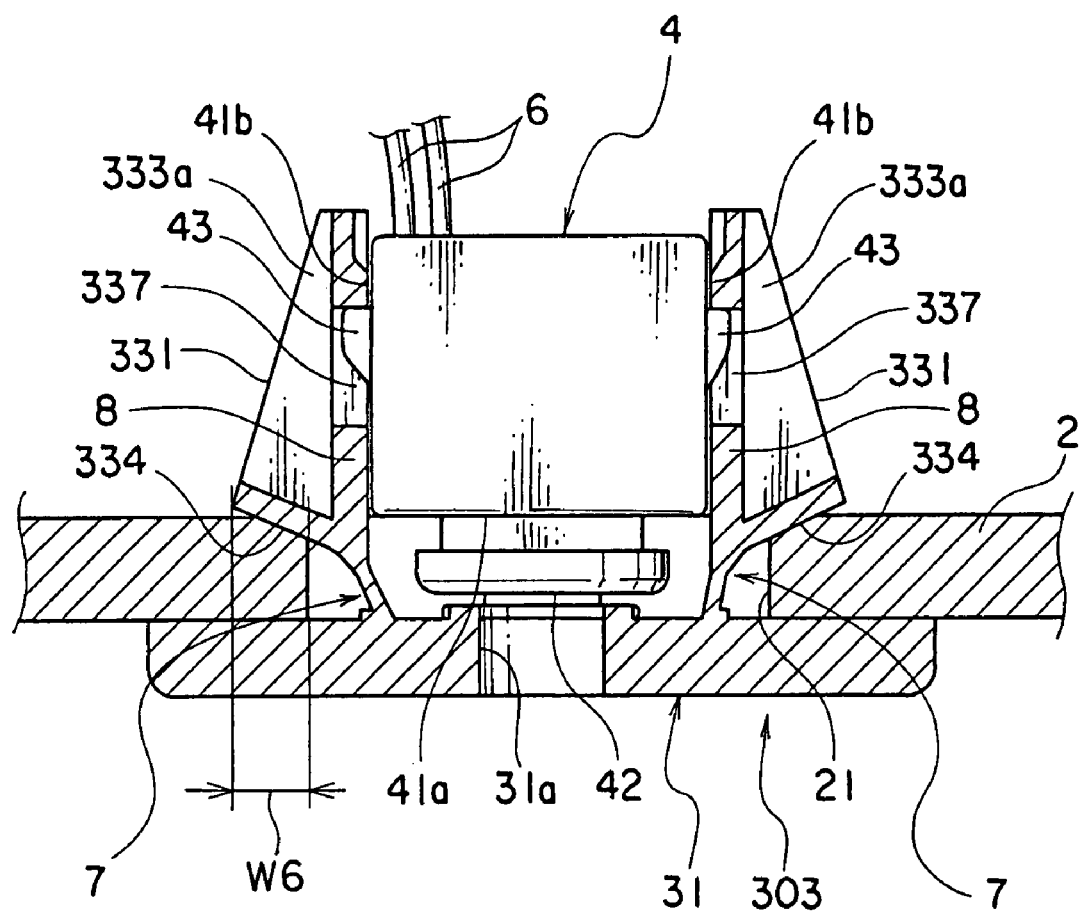
FIG. 20 is a sectional view showing the second part shown in FIG. 19 assembled with the first part, and the first part permanently locked on the attaching hole.
Figure 21:
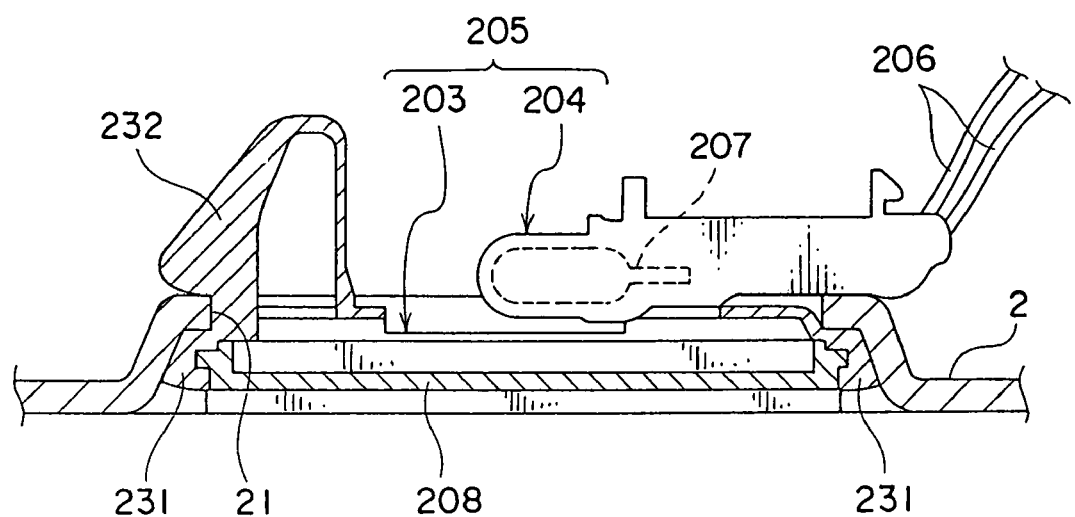
FIG. 21 is a sectional view showing a conventional attaching structure for attaching a conventional room lighting system to an attaching hole of a roof trim.
Figure 22:
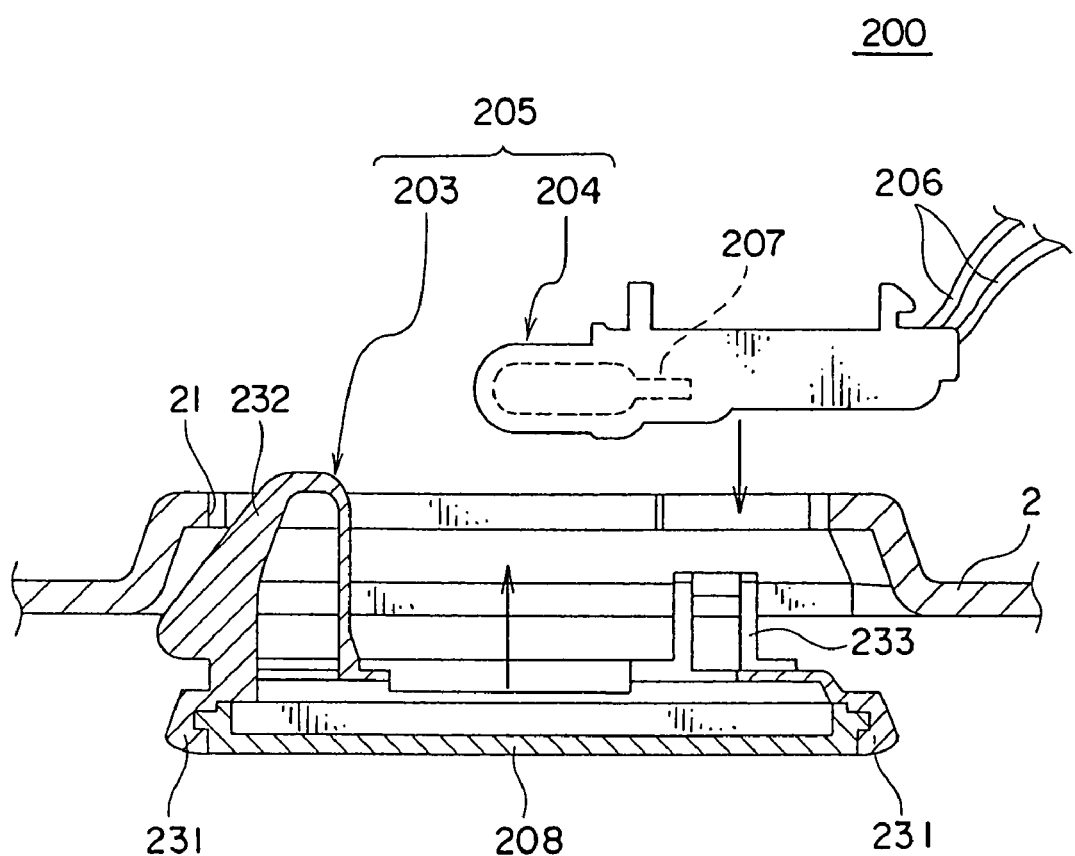
FIG. 22 is a sectional view showing the room lighting system shown in FIG. 21 locked on the attaching hole of the roof trim.
Figure 23:
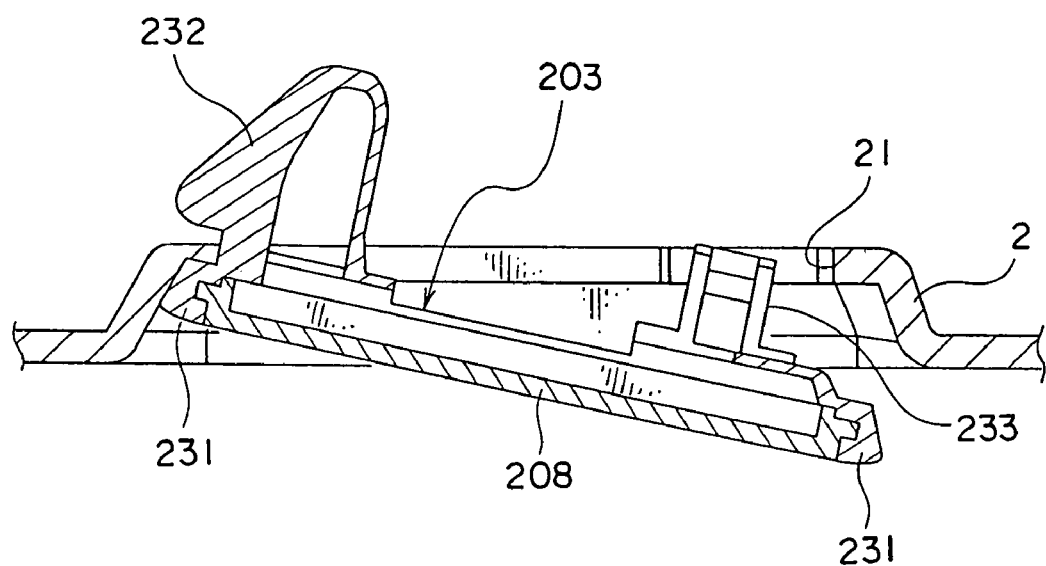
FIG. 23 is a sectional view for explaining a problem of the conventional attaching structure of the room lighting system shown in FIGS. 21 and 22.

A locking hole 337 for fixing the function part 4 to the design part 303 by engaging with the locking projection 43 of the function part 4 is formed on the center of the main part 8. As shown in FIGS. 19 and 20, while the design part 303 is temporarily locked on the attaching hole 21, the function part 4 is positioned between the pair of main parts 8. When the function part 4 is positioned between the pair of main parts 8, the pair of main parts 8 is pushed to be bent around the connecting part 7 in a direction of separating each other. Then, the outer edges of the later-described clamping parts 334, namely, the outer edges of the vertically extending parts 330 are positioned further outside the attaching hole 21, so that the design part 303 is permanently locked on the attaching hole 21 as shown in FIG. 20.

Further, when the pair of main parts 8 are bent in the direction of separating each other, the plate part 31 connected to the main parts 8 is pushed toward the rear side of the attaching hole 21. Thus, the plate part 31 abuts on a surface of the roof trim 2 at the cabin side without any gap.

The clamping part 334 is formed in a plate shape, vertically extended from the main part 8 at a far side of the other main part 8, and vertically extended from an end near the connecting part 7. Further, the clamping part 334 is disposed in a direction of facing the plate part 31. While the design part 303 is permanently locked on the attaching hole 21, the clamping part 334 is inclined to remove further away from the plate part 31 as the clamping part 334 is removed further away from the main part 8.

While the design part 303 is temporarily locked on the attaching hole 21, an outer edge of the clamping part 334 away from the main part 8 is positioned outside the attaching hole 21, and the edge of the attaching hole 21 is caught between the edge of the clamping part 334 and the plate part 31. Namely, the outer edge of the clamping part 334 constitutes an outer edge of the vertically extending part 330. Further, according to the present invention, the outer edge of the vertically extending part 330 means the most outside portion of the vertically extending part 330 in a direction of the pair of vertically extending parts 330 facing each other.

While the design part 303 is permanently locked on the attaching hole 21, the outer edge of the clamping part 334 away from the main part 8 is positioned further outside the attaching hole 21 than that at the temporary locking state. The edge of the attaching hole 21 is caught between the outer edge of the clamping part 334 and the plate part 31. When the 303 is permanently locked on the attaching hole 21, the function part 4 inserted into between the pair of main parts 8 bends the main parts 8 in a direction of separating each other, namely, outside the attaching hole 21, so that the clamping part 334 breaks into the inner edge of the attaching hole 21 at the rear side.

The pair of guiding parts 333a is formed in a triangular shape in a plan view, and disposed with a gap to each other. The pair of guiding parts 333a connects a surface of the main part 8 away from the other main part 8 to both edges of the clamping part 334 along a width direction thereof. The guiding part 333a includes the slope wall 331 which is inclined in a direction of extending from the outer edge of the clamping part 334 to the main part 8 as the guiding part 333a removes from the connecting part 7 along the extending direction of the main part 8 while the vertically extending parts 330 are not pushed. When the vertically extending parts 330 are inserted into the attaching hole 21, the slope walls 331 of the guiding parts 333a slide on the inner edge of the attaching hole 21 to bend the pair of vertically extending parts 330 in a direction of approaching each other. Further, the guiding parts 333a reinforce strength of the clamping parts 334.

For attaching the lamp unit 5''' to the attaching hole 21 of the roof trim 2, firstly, as shown in FIG. 7, the design part 303 separated from the function part 4 is pushed up from the cabin side toward the ceiling side while the abutting wall 333 faces the ceiling. Then, the pair of vertically extending parts 330 is inserted into the attaching hole 21, and as shown in FIG. 18, the design part 3 is temporarily locked on the attaching hole 21.

At this time, when the slope walls 331 of the guiding parts 333a slide on the inner edge of the attaching hole 21, the pair of vertically extending parts 330 is bent around the connecting part 7 in a direction of approaching each other. Then, the outer edges of the clamping parts 334 are positioned inside the attaching hole 21, and the pair of vertically extending parts 330 is inserted into the attaching hole 21. Incidentally, in the present invention, a state that outer edge of the clamping part 334 is positioned inside the attaching hole 21 is expressed by that the vertically extending part 330 is positioned at the insertion position.

Then, the pair of vertically extending parts 330 is moved in a direction of separating each other owing to the resilient restoring force, and the outer edges of the clamping parts 334 are respectively positioned outside the attaching hole 21. Then, the design part 303 is temporarily locked on the attaching hole 21 while the edge of the attaching hole 21 is caught between the clamping part 334 and the plate part 31. In the temporary locking state, the pair of vertically extending parts 330 is bent in a direction of approaching each other, and the clamping part 334 is so positioned that the locking margin to the edge of the attaching hole 21 is W5. Incidentally, in the present invention, a state that the clamping part 334 is positioned at the position where the locking margin to the edge of the attaching hole 21 is W5 is expressed by that the vertically extending part 330 is positioned at the temporary locking position.

Next, as shown in FIG. 19, the function part 4 is inserted into between the pair of main parts 8 of the design part 303 which is temporarily locked on the attaching hole 21. At this time, when the function part 4 pushes the gap between the main parts 8 facing each other, the clamping part 334 is shifted further outside the attaching hole 21.

Then, when the function part 4 is further pushed, as shown in FIG. 20, the locking projections 43 of the function part 4 and the locking hole 337 of the main part 8 is engaged with each other, and the function part 4 is assembled with the design part 303. Under this condition, surfaces of the pair of main parts 8 facing each other resiliently abut on the sidewalls 41b of the function part 4. When the function part 4 is assembled with the design part 303, the clamping part 334 is positioned at a position where the locking margin to the edge of the attaching hole 21 is W6, and the design part 303, namely, the lamp unit 5''' is permanently locked on the attaching hole 21.

While the design part 303 is permanently locked on the attaching hole 21, the clamping part 334 breaks into the inner edge of the attaching hole 21 at the rear side to prevent the design part 303 from rattling in a direction of the pair of vertically extending parts 330 facing each other. Incidentally, in the present invention, a state that the clamping part 334 is positioned at the position where the locking margin to the edge of the attaching hole 21 is W6 is expressed by that the vertically extending parts 330 are positioned at the permanent locking position.

According to this embodiment, when the function part 4 is assembled with the design part 303, the locking margin between the clamping part 334 and the edge of the attaching hole 21 is increased from W5 at the temporary locking state to W6 at the permanent locking state. Therefore, the pair of vertically extending parts 330 can be inserted into the attaching hole 21 with low insertion force at the temporary locking state, and sufficient holding force to the edge of the attaching hole 21 is secured owing to the permanent locking state. Accordingly, the lamp unit 5''' is surely prevented from falling out of the attaching hole 21.

Further, at the permanent locking state, even if the design part 303 is pulled from a front side of the attaching hole 21 toward the cabin, because the function part 4 is positioned between the pair of main parts 8, the main parts 8 does not bend in a direction of approaching each other. Therefore, the locking margin to the edge of the attaching hole 21 does not change. Therefore, the lamp unit 5''' is further surely prevented from falling out of the attaching hole 21, and the function part 4 is prevented from falling out of the design part 303.

Further, because the pair of main parts 8 is bent in a direction of separating each other, the plate part 31 connected to the main parts 8 is pulled toward the rear side of the attaching hole 21. Therefore, the plate part 31 abuts on a surface of the roof trim 2 at the cabin side without any gap.

Further, because the vertically extending part 330 includes the clamping part 334 as the slope breaking into the inner edge of the attaching hole 21 at the rear side while the design part 303 is permanently locked on the attaching hole 21, the design part 303, namely, the lamp unit 5''' can be attached to the attaching hole 21 without rattle.

According to the present invention, the slope part may be the rib 34a described in the first embodiment, or may be the clamping part 334 described in the second embodiment.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An attaching structure for attaching an attaching object composed of first and second parts to an attaching hole formed on a panel,
   wherein the first part includes: a plate part formed larger than an outer shape of the attaching hole, and disposed in front of the attaching hole; and a pair of vertically extending parts facing each other, extending from the plate part, and having a resilient connecting part,
   wherein when the pair of vertically extending parts is inserted into a rear side of the attaching hole via an inside of the attaching hole, the plate part is bent around the connecting part,
   wherein the pair of vertically extending parts is formed movably among: an insertion position where outer edges of the vertically extending parts are positioned at an inside of the attaching hole; a temporary locking position where the outer edges are positioned at an outside of the attaching hole, and the first part is temporarily locked on the attaching hole while catching an edge of the attaching hole with the plate part; and a permanent locking position where the outer edges are positioned at an outer side of the attaching hole than that of the temporary locking position, and the first part is permanently locked on the attaching hole,
   wherein when the first part separated from the second part is temporarily locked on the attaching hole, and then the second part is pushed into between the pair of vertically extending parts, the second part is assembled with the first part, and the pair of vertically extending parts is positioned at the permanent locking position.

2. The attaching structure as claimed in claim 1,
   wherein when the pair of vertically extending parts is bent around the connecting part connected to the plate part and formed thinner than the other parts, the pair of vertically extending parts is shifted from the insertion position to the permanent locking position.

3. The attaching structure as claimed in claim 1,
   wherein the pair of vertically extending parts includes: a frame part vertically extended from the plate part in a direction perpendicular to the plate part; and a pair of movable pieces disposed in the frame part, continued to an end of the frame part at a far side of the plate part, and bent around the connecting part owing to the connecting part connected to the frame part being thinner than the other parts,
   wherein when the second part is pushed into between the pair of movable pieces, the pair of movable pieces is bent in a direction of separating each other, and the edge of the attaching hole is positioned between outer edges of the movable pieces and the plate part.

4. The attaching structure as claimed in claim 1,
   wherein the pair of vertically extending parts includes slope parts sloped in a direction of removing from the plate part, and breaking into an inner edge at the rear side of the attaching hole as the pair of vertically extending parts separates from each other in a state that the pair of vertically extending parts is positioned at the permanent locking position.

5. The attaching structure as claimed in claim 1,
   wherein the pair of vertically extending parts includes guiding members for guiding the second part into therebetween.

* * * * *